United States Patent
Zhang et al.

(10) Patent No.: US 12,229,460 B2
(45) Date of Patent: Feb. 18, 2025

(54) SYSTEMS AND METHODS FOR PROVIDING INDICATIONS DURING ONLINE MEETINGS

(71) Applicant: Citrix Systems, Inc., Fort Lauderdale, FL (US)

(72) Inventors: Wenshuang Zhang, Nanjing (CN); Ke Xu, Nanjing (CN); Xuan Liu, Nanjing (CN); Chunhui Wu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 52 days.

(21) Appl. No.: 17/679,668

(22) Filed: Feb. 24, 2022

(65) Prior Publication Data
US 2023/0259317 A1     Aug. 17, 2023

Related U.S. Application Data

(63) Continuation of application No. PCT/CN2022/076301, filed on Feb. 15, 2022.

(51) Int. Cl.
*G06F 17/00* (2019.01)
*G06F 3/14* (2006.01)
(Continued)

(52) U.S. Cl.
CPC ............. *G06F 3/14* (2013.01); *G06F 40/279* (2020.01); *G10L 15/08* (2013.01); *G10L 15/22* (2013.01);
(Continued)

(58) Field of Classification Search
CPC ......... G06F 3/14; G06F 40/279; G10L 15/08; G10L 15/22; G10L 2015/088; H04L 65/403
(Continued)

(56) References Cited

U.S. PATENT DOCUMENTS 7,298,930 B1 *  11/2007  Erol ................... G11B 27/28
                                                707/999.001
9,652,113 B1 *   5/2017  Colson ............... G06Q 10/1095
(Continued)

FOREIGN PATENT DOCUMENTS

CN        104756056 A      7/2015
CN        110235154 A      9/2019
(Continued)

OTHER PUBLICATIONS

Archibald, Using Zoom Videoconferencing for qualitative Data Collection: Perceptions and experiences of Researchers and Participants, International Journal of Qualitative Methods, 2019 (Year: 2019).*

(Continued)

*Primary Examiner* — Adam M Queler
*Assistant Examiner* — Matthew J Ludwig

(57) ABSTRACT

One disclosed method involves a computing system determining a keyword of interest for an online meeting being presented via a user interface, determining that content of the online meeting corresponds to the keyword of interest, and causing, in response to the content of the online meeting corresponding to the keyword of interest, the user interface to output an indication that the content of the online meeting being presented is potentially of interest. Another disclosed method involves a computing system determining data indicative of a number of client devices, from a plurality of client devices participating in an online meeting, for which a user interface for the online meeting is presented in an active window, and causing, based at least in part on the data, a first client device, from the plurality of client devices, to output an indication that content of the online meeting being presented is potentially of interest.

14 Claims, 18 Drawing Sheets

(51) Int. Cl.
*G06F 40/279* (2020.01)
*G10L 15/08* (2006.01)
*G10L 15/22* (2006.01)
*H04L 65/403* (2022.01)

(52) U.S. Cl.
CPC ...... *G10L 2015/088* (2013.01); *H04L 65/403* (2013.01)

(58) Field of Classification Search
USPC .......................................................... 715/753
See application file for complete search history.

(56) References Cited

U.S. PATENT DOCUMENTS

| | | | |
|---|---|---|---|
| 9,900,632 B1* | 2/2018 | Flores Guerra | G06F 16/7867 |
| 9,916,383 B1* | 3/2018 | Ching | G06F 16/93 |
| 11,216,787 B1* | 1/2022 | Shetty | G06Q 10/1095 |
| 11,336,706 B1* | 5/2022 | Saito | H04L 65/403 |
| 11,526,699 B2* | 12/2022 | Shimazu | G06V 20/20 |
| 11,677,991 B1* | 6/2023 | Balannik | H04N 21/8586 725/32 |
| 2008/0114737 A1 | 5/2008 | Neely | |
| 2009/0245500 A1* | 10/2009 | Wampler | H04M 7/006 379/265.09 |
| 2014/0123027 A1* | 5/2014 | Kozloski | G06Q 10/1095 715/753 |
| 2016/0196563 A1* | 7/2016 | Srinivasan | G06Q 50/01 705/7.29 |
| 2016/0350724 A1* | 12/2016 | Tang | G06Q 10/1095 |
| 2017/0006069 A1* | 1/2017 | Srivastava | H04L 65/1069 |
| 2017/0075503 A1* | 3/2017 | Chakra | G06F 3/1454 |
| 2017/0201575 A1 | 7/2017 | Song | |
| 2018/0277142 A1* | 9/2018 | Veeramani | G10L 25/57 |
| 2019/0166176 A1 | 5/2019 | Jain et al. | |
| 2019/0251400 A1* | 8/2019 | Takahashi | G06F 16/9024 |
| 2019/0305976 A1* | 10/2019 | Bender | G10L 15/1807 |
| 2019/0361966 A1* | 11/2019 | Munro | G06F 16/24532 |
| 2019/0384854 A1* | 12/2019 | Mahmoud | G06F 16/61 |
| 2020/0059375 A1 | 2/2020 | Hewitt | |
| 2020/0320478 A1* | 10/2020 | Crawford | H04L 65/1066 |
| 2020/0356630 A1 | 11/2020 | Silverstein | |
| 2020/0382637 A1 | 12/2020 | Cranfill | |
| 2021/0158805 A1* | 5/2021 | Sivasubramanian | G06F 16/61 |
| 2022/0124285 A1 | 4/2022 | Punwani | |
| 2022/0271962 A1* | 8/2022 | Patel | G06F 3/167 |
| 2023/0023037 A1* | 1/2023 | Aseniero | G06F 3/167 |
| 2023/0052258 A1* | 2/2023 | Akhoury | G06F 16/634 |

FOREIGN PATENT DOCUMENTS

| | | |
|---|---|---|
| CN | 113259619 A | 8/2021 |
| WO | 2011136794 A1 | 11/2011 |

OTHER PUBLICATIONS

Chandrasegaran, 'TalkTraces: Real-Time Capture and Visualization of Verbal Content in Meetings', published May 2019, ACM (Year: 2019).*

Deselaers, Improved Group Chat User Experience by Use of Topic Detection, Technical Disclosure Commons, Published 2018 (Year: 2018).*

International Search Report and Written Opinion issued Nov. 15, 2022 for International Patent Application No. PCT/CN2022/076301.

* cited by examiner

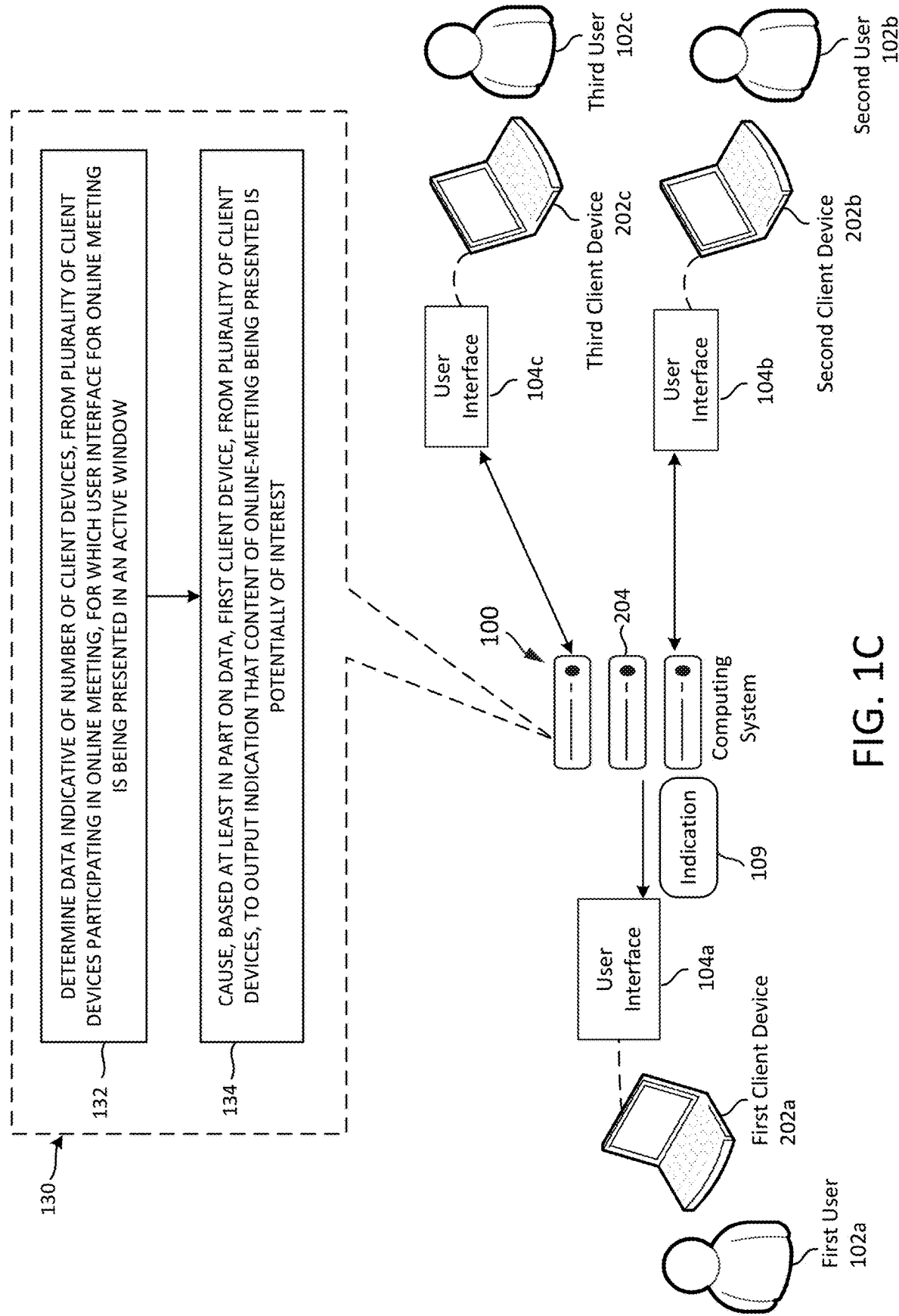

SYSTEMS AND METHODS FOR PROVIDING INDICATIONS DURING ONLINE MEETINGS

CROSS-REFERENCE TO RELATED APPLICATIONS

This application is a continuation of and claims the benefit under 35 U.S.C. § 120 and 35 U.S.C. § 365(c) to International Application PCT/CN2022/076301, entitled SYSTEMS AND METHODS FOR PROVIDING INDICATIONS DURING ONLINE MEETINGS, with an international filing date of Feb. 15, 2022, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, FL, including the Citrix Workspace™ family of products and the Virtual Apps and Desktops™ systems, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method may involve determining, by a computing system, a keyword of interest for an online meeting being presented via a user interface, determining, by the computing system, that content of the online meeting corresponds to the keyword of interest, and causing, by the computing system and in response to the content of the online meeting corresponding to the keyword of interest, the user interface to output an indication that the content of the online meeting being presented is potentially of interest.

In some of the disclosed embodiments, a method may involve determining, by a computing system, data indicative of a number of client devices, from a plurality of client devices participating in an online meeting, for which a user interface for the online meeting is being presented in an active window, and causing, by the computing system and based at least in part on the data, a first client device, from the plurality of client devices, to output an indication that content of the online meeting being presented is potentially of interest.

In some disclosed embodiments, a computing system may comprise at least one processor, and at least one computer-readable medium encoded with instructions which, when executed by the at least one processor, cause the system to determine a keyword of interest for an online meeting being presented via a user interface, determine that content of the online meeting corresponds to the keyword of interest, and cause, in response to the content of the online meeting corresponding to the keyword of interest, the user interface to output an indication that the content of the online meeting being presented is potentially of interest.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1C shows another example implementation of a system for providing an indication during an online meeting that content being presented is potentially of interest, in accordance with some embodiments of the present disclosure;

DETAILED DESCRIPTION

Figure 1A:
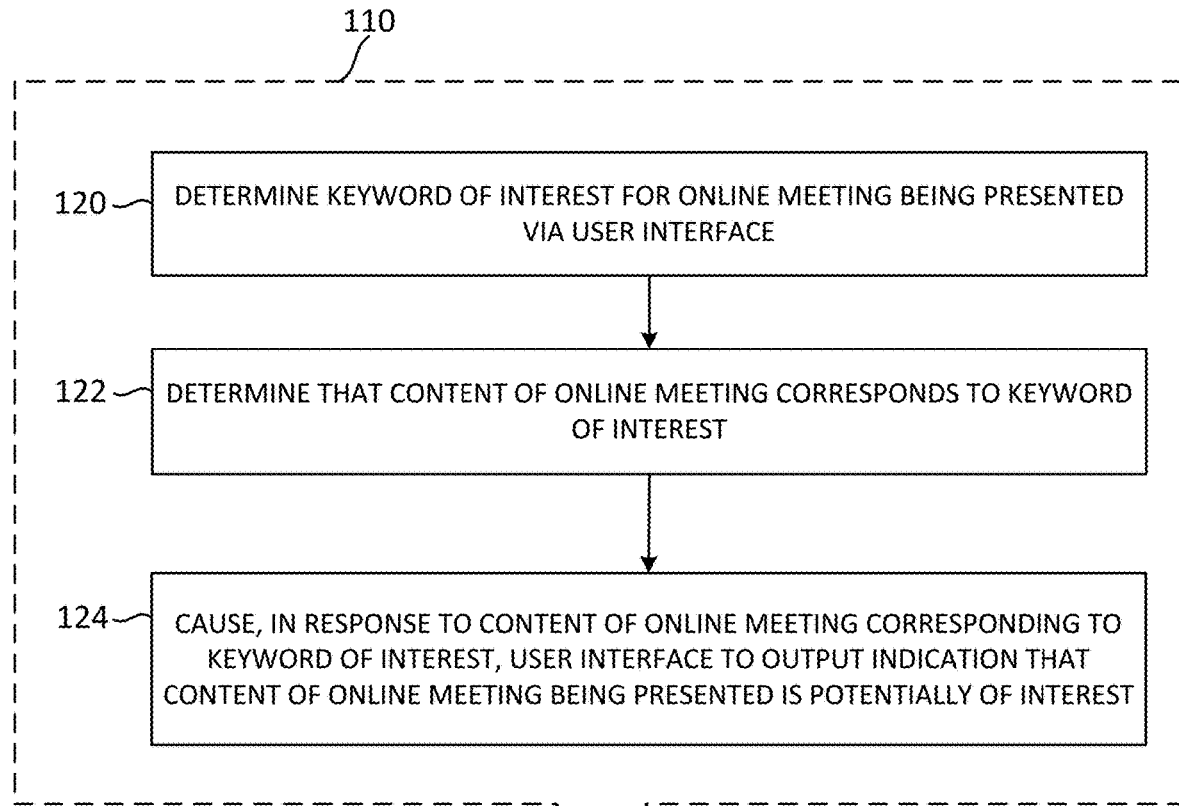
FIG. 1A shows an example implementation of a system for providing an indication during an online meeting that content being presented is potentially of interest, in accordance with some embodiments of the present disclosure.
Figure 1A:
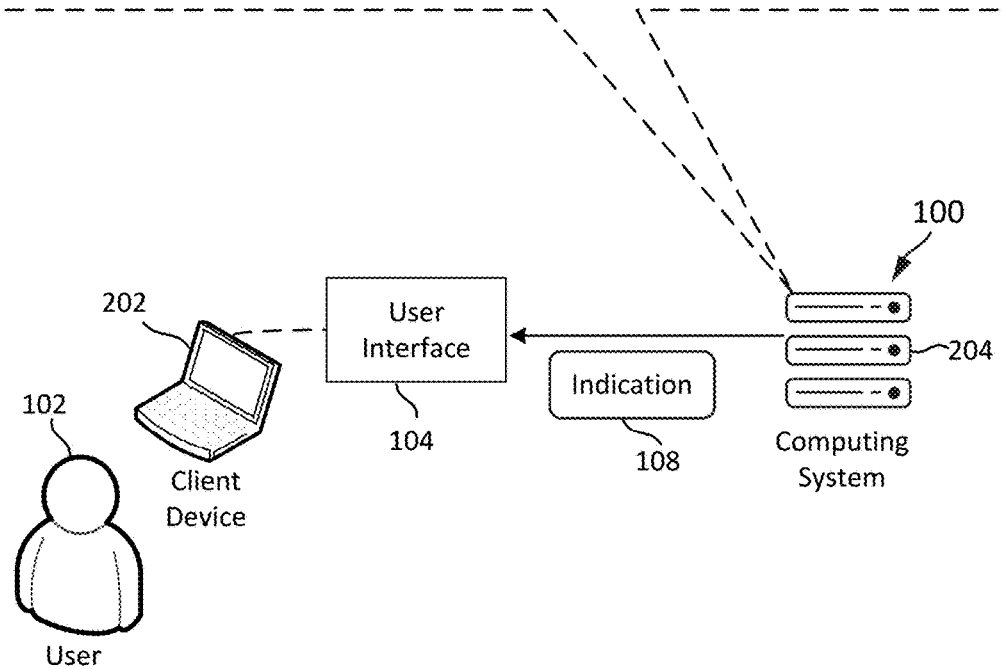

Users participate in online meetings via a client device on a regular basis, which at a minimum allow users to have a speech-based conversation, and which may additionally allow users to view other users (via cameras), share screens, engage in chat messages, etc. Online meetings may also be referred to as virtual meetings. A user's attention span may be limited. For example, a user may pay close attention to the meeting for a limited time period (e.g., the first 15 minutes of the meeting), and may then switch to another task on the client device or otherwise. In other cases, a user may not pay attention to the meeting when the content being presented is not of particular interest to the user. The inventors have recognized and appreciated that a user may thus at least occasionally miss some content of interest during an online meeting.

Offered are techniques for providing indications during an online meeting to indicate to a user that content being presented may be of potential interest. Some embodiments involve identifying a keyword associated with an online meeting, determining that content being presented during the online meeting corresponds to the keyword, and causing output of an indication representing that the content being presented is potentially of interest. In such embodiments, the keyword may be selected or otherwise provided by a user. In such embodiments, the indication may be outputted as a signal or additional stimulation to bring the user's attention back to the online meeting when content of interest corresponding to the keyword is being presented.

Some embodiments may additionally or alternatively involve determining meeting "attentiveness" based on the number of participants paying attention to the online meeting. Such embodiments may involve determining a certain number or percentage of participants, via their respective client devices, that have the online meeting in an active window, and when that number or percentage satisfies a condition (e.g., a threshold level), then an indication may be outputted, where the indication represents that the content being presented is potentially of interest. In such embodiments, the indication may be outputted based on the content being of interest to most of the participants, e.g. by inferring from a high level of general interest in the content that the content is likely also of interest to the user for whom the indication is outputted.

In some implementations, the user may use a remote access technique to access (launch/open) a meeting application to engage in the online meeting. Such remote access techniques may be enabled, for example, by a multi-resource access system 500 (described below in relation to FIGS. 5A-5C in Section E). In some implementations, the indications may be presented by the meeting application. In other implementations, the indications may additionally or alternatively be presented by the multi-resource access system 500, e.g., as an overlay to the meeting application at the user's client device.

For purposes of reading the description below of the various embodiments, the following descriptions of the sections of the specification and their respective contents may be helpful:

Section A provides an introduction to example embodiments of a system for providing indications of potentially interesting content during online meetings;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F provides a more detailed description of example embodiments of the system for providing indications of potentially interesting content during online meetings introduced in Section A; and Section G describes example implementations of methods, systems/devices, and computer-readable media in accordance with the present disclosure.

A. Introduction to Illustrative Embodiments of a System for Providing Indications of Potentially Interesting Content During Online Meetings FIG. 1A shows an example system configuration with which some aspects of the present disclosure may be implemented. As shown, a computing system 100 may be in communication with a client device 202 operated by a user 102. The computing system 100 may be in communication with the client device 202 via one or more networks 206 (shown in FIG. 2). The client device 202 may provide a user interface 104, which may be configured to enable the user 102 to engage in an online meeting. The computing system 100 may be implemented by one or more servers 204. Examples of components that may be used to implement the client device 202 and the server(s) 204, as well as examples of computing environments in which such components may be deployed, are described below in connection with FIGS. 2-4.

An application may be launched via the client device 202, which may cause presentation of the user interface 104 and enable the user 102 to participate in an online meeting. In some embodiments, the user interface 104 may be of a meeting application, such as GoToMeeting, Microsoft Teams, ZOOM, Google Meet, Slack, etc. In some embodiments, the computing system 100 may be configured to provide online meeting capabilities, and may be configured to determine when content of the online meeting is potentially of interest to a user, and present indications accordingly.

In other embodiments, the user interface 104 may be of a resource access application 522 of the multi-resource access system 500 shown in FIGS. 5B-5C and described below in Section E. One or more SaaS applications 508 may be accessed via the client device 202, using the user interface 104 of the resource access application 522. In some implementations, one of the SaaS applications 508 may be a meeting application that enables the user 102 to participate in online meetings. In such embodiments, the computing system 100 may include one or more components of, and/or operate in conjunction with, the multi-resource access system 500 shown in FIGS. 5A-5C and described below in Section E.

In some implementations, the computing system 100 may perform a routine 110, as shown in FIG. 1A. An online meeting may be launched via the client device 202 and may be presented via the user interface 104. The client device 202 may send data indicative of the launched online meeting to the computing system 100. In some implementations, the client device 202 may also send data identifying the user 102 and/or the client device 202. At a step 120 of the routine 110, the computing system 100 may determine one or more keywords of interest for the online meeting being presented via the user interface 104. The computing system 100 may, for example, determine the keyword(s) of interest using a data storage and the data received from the client device 202. As described below in Section F, in some implementations, the computing system 100 may include, or may be in communication with, a data storage storing data associating keywords with online meetings for particular users and/or client devices. To enable the computing system 100 to identify the correct keywords to use for comparison purposes (as described below), the data received from the client device 202 may be indicative of which online meeting is launched, and may additionally identify the user 102 and/or the client device 202.

At a step 122 of the routine 110, the computing system 100 may determine that content of the online meeting corresponds to one or more keywords of interest. The content of the online meeting may, for example, include speech from one or more participants (e.g., the user 102 and/or other users) of the online meeting, which may be captured as audio data. In some implementations, the speech from the participants may be captured as audio data and converted to text data using automatic speech recognition techniques and/or speech-to-text techniques. The audio data and/or the text data may be determined by the computing system 100 based on voice inputs provided by the participants of the online meeting via their respective client devices 202. In some implementations, the content of the online meeting may additionally or alternatively include information shared by the participants using a screen share feature, which may involve displaying of text and/or images. In such implementations, the computing system 100 may additionally or alternatively process the shared information (text and/or images) using computer vision techniques, optical character recognition (OCR) techniques, and/or other techniques to understand the information being shared. In some implementations, the content of the online meeting may additionally or alternatively include non-speech audio (e.g., music, recorded audio, etc.), video, chat messages, and/or other types of inputs that may be provided by the participants of the online meeting. Using any of the foregoing types of content being presented during the online meeting, the computing system 100 may determine that the content corresponds to one or more keywords of interest (e.g., as determined in the step 120 of the routine 110).

Figure 1B:
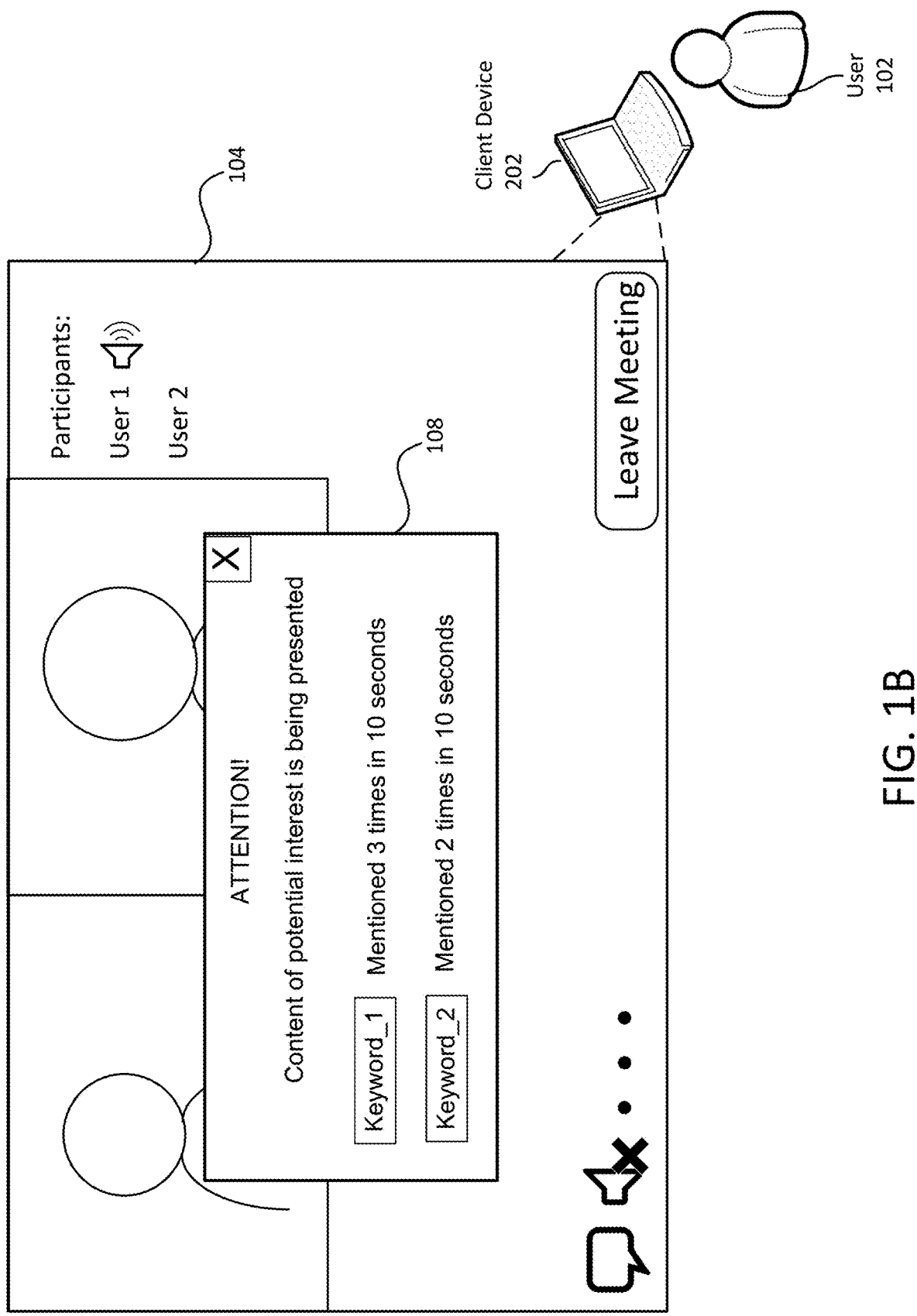
FIG. 1B shows an example user interface screen providing an indication during an online meeting according to the system shown in FIG. 1A.

At a step 124 of the routine 110, the computing system 100 may cause, in response to the content of the online meeting corresponding to one or more keywords of interest, the user interface 104 to output an indication 108 that the content of the online meeting being presented is potentially of interest. FIG. 1B shows an example user interface 104 including an example indication 108 that content being presented is potentially of interest to the user 102. As shown in FIG. 1B, in some implementations, the indication 108 may be a pop-up dialog box, which may be displayed within the user interface 104. In other implementations, the indication 108 may additionally or alternatively be overlaid on top of the online meeting content. In some implementations, the indication 108 may be presented in such a manner that the indication 108 is overlaid on top of any content that is actively being displayed at the client device 202, so that the indication 108 is visible to the user 102 even when a window/application presenting the online meeting is minimized or in the background. In other implementations, output of the indication 108 may cause the window/application presenting the online meeting, which may have been previously minimized or in the background, to become maximized or brought to the foreground, so that both the indication 108 and the online meeting become visible to the user 102.

In some implementations, the indication 108 may include an audible indication, such as a chime, a beep, or other sound that may be outputted via one or more speakers of the client device 202. In some implementations, in addition to or in lieu of a pop-up dialog box, the indication 108 may include an image or other graphical user interface element. In some implementations, the indication 108 may be presented via a user interface other than the user interface 104, such as a notification menu/bar provided by an operating system of the client device 202 or by the resource access application 522.

In this manner, the computing system 100 can provide an indication when content being presented during an online meeting corresponds to a keyword of interest.

FIG. 1C shows another example configuration of the client devices 202 and the computing system 100 with which some aspects of the present disclosure may be implemented. As shown, the computing system 100 may be in communication with multiple client devices 202 via one or more networks 206 (shown in FIG. 2). An online meeting may be launched at multiple client devices 202, and may be presented via respective user interfaces 104*a*, 104*b*, 104*c* to respective users 102*a*, 102*b*, 102*c*. For illustrative purposes, FIG. 1C shows a first client device 202*a* presenting the online meeting via a first user interface 104*a*, a second client device 202*b* presenting the online meeting via a second user interface 104*b*, and a third client device 202*c* presenting the online meeting via a third user interface 104*c*. The computing system 100 may enable access and participation in the online meeting by receiving and sending data being shared/inputted via the client devices 202.

In some implementations, the computing system 100 may perform a routine 130, as shown in FIG. 1C. At a step 132 of the routine 130, the computing system 100 may determine data indicative of a number of client devices 202, from a plurality of client devices 202 participating in the online meeting, for which the user interface 104 for the online meeting is being presented in an active window. In some implementations, for example, the client devices 202 may send, to the computing system 100, data indicating whether the user interface 104 is being presented in an active window or an inactive window at the client device 202. In some implementations, the online meeting may be considered as being presented in an active window when the user interface 104 is presently fully visible via a screen of the client device 202. In such implementations, the online meeting may be considered as being presented in an inactive window when the user interface 104 is minimized or is covered by another user interface, window or content different from the online meeting, such that the content of the online meeting is not presently fully visible on the screen of the client device 202. The user interface 104 being presented in an active window may be also be referred to as the user interface 104 being in the foreground at the client device 202, and the user interface 104 being presented in an inactive window may be also be referred to as the user interface 104 being in the background at the client device 202.

As one example, the second client device 202b may send, to the computing system 100, data indicative of whether the second user interface 104b is being presented in an active window. As a further example, the third client device 202c may send, to the computing system 100, data indicative of whether the third user interface 104c is being presented in an active window. Using the data received from the plurality of client devices 202 participating in the online meeting, the computing system 100 may determine the number of client devices 202 for which the user interface 104 is currently being presented in an active window.

Figure 1D:
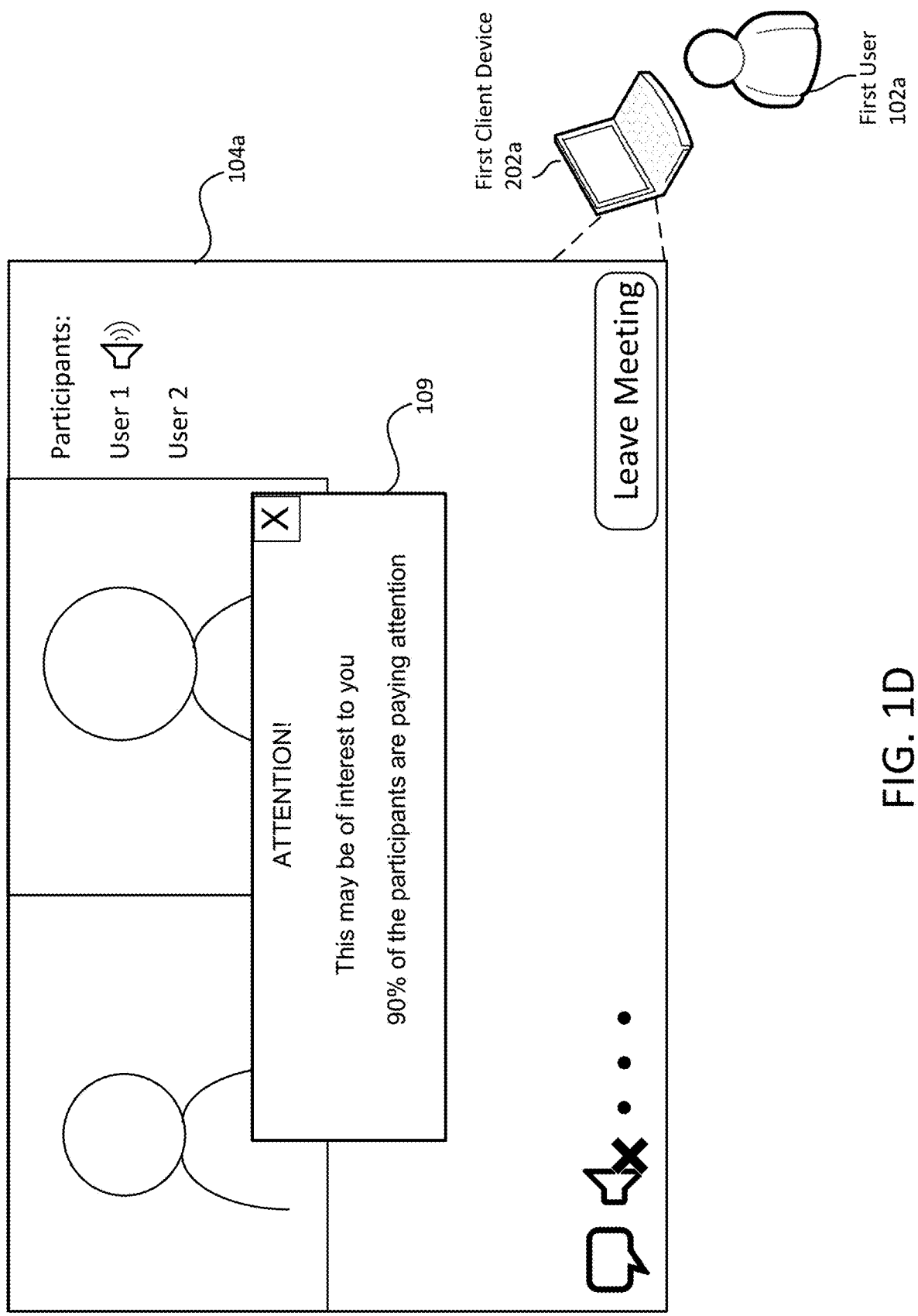
FIG. 1D shows an example user interface screen providing an indication during an online meeting according to the system shown in FIG. 1C.

At a step 134 of the routine 130, the computing system 100 may cause, based at least in part on the data (received in the step 132), the first client device 202a, from the plurality of client devices 202, to output an indication 109 that content of the online meeting being presented is potentially of interest. FIG. 1D shows an example user interface 104a including an example indication 109 that content being presented is potentially of interest to the first user 102a. As shown in FIG. 1D, in some implementations, the indication 109 may be a pop-up dialog box, which may be displayed within the user interface 104a. In other implementations, the indication 109 may additionally or alternatively be overlaid on top of the online meeting content. In some implementations, the indication 109 may be presented in such a manner that the indication 109 is overlaid on top of any content that is actively being displayed at the first client device 202a, so that the indication 109 is visible to the first user 102a even when a window/application presenting the online meeting is minimized or in the background. In other implementations, output of the indication 109 may cause the window/application presenting the online meeting, which may have been previously minimized or in the background, to become maximized or brought to the foreground, so that both the indication 109 and the online meeting become visible to the first user 102a.

In some implementations, the indication 109 may additionally or alternatively include an audible indication, such as a chime, a beep, or other sound that may be outputted via one or more speaker of the first client device 202a. In some implementations, in addition to or in lieu of a pop-up dialog box, the indication 109 may include an image or other graphical user interface element. In some implementations, the indication 109 may be presented via a user interface other than the user interface 104a, such as a notification menu/bar provided by an operating system of the first client device 202a or by the resource access application 522.

In this manner, the computing system 100 can provide an indication when content being presented during an online meeting is being actively viewed by a certain number of participants of the online meeting.

Additional details and example implementations of embodiments of the present disclosure are set forth below in Section F, following a description of example systems and network environments in which such embodiments may be deployed.

B. Network Environment

Figure 2:
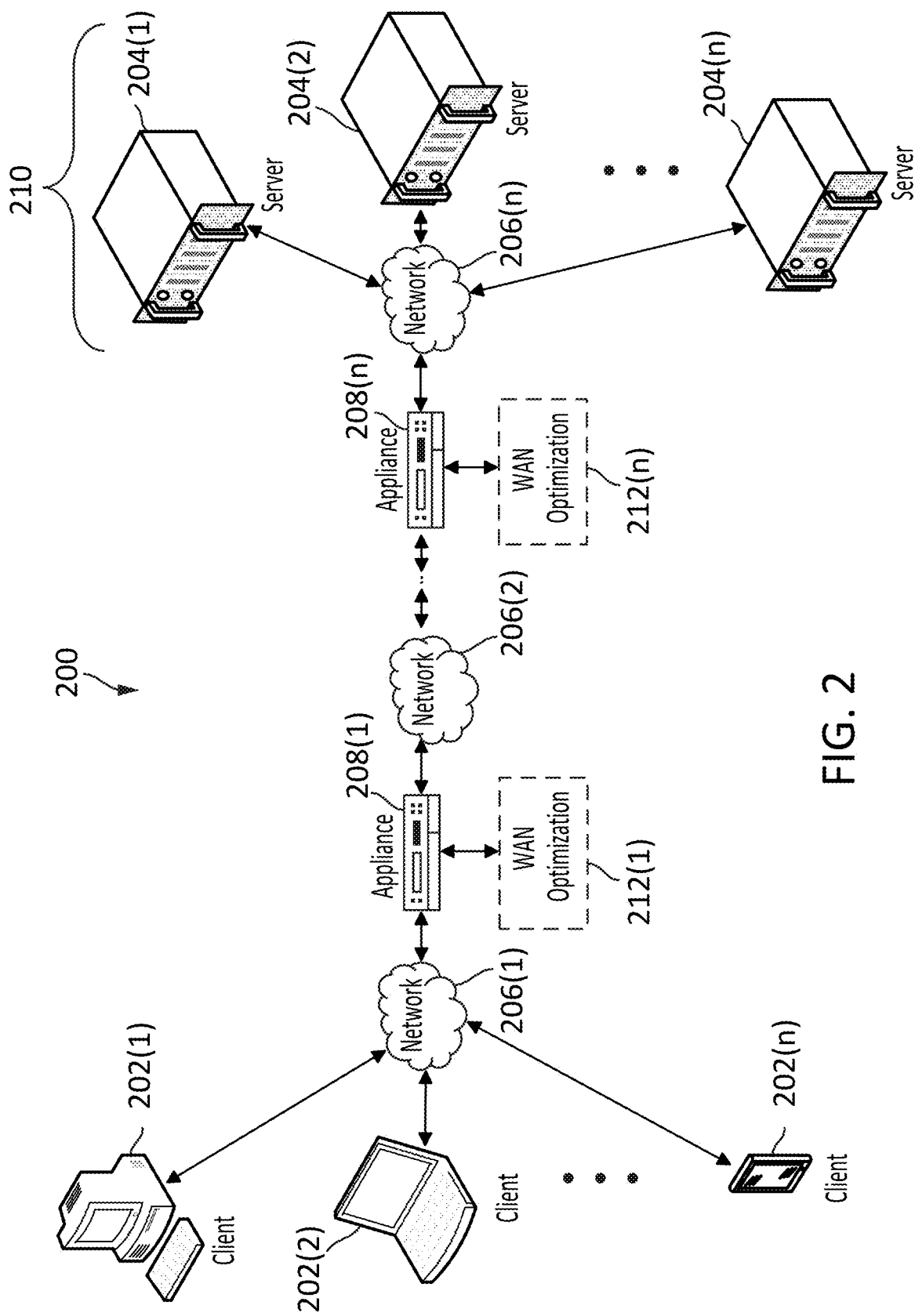
FIG. 2 is a diagram of a network environment in which some embodiments of the novel systems and methods disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server;

a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FL, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
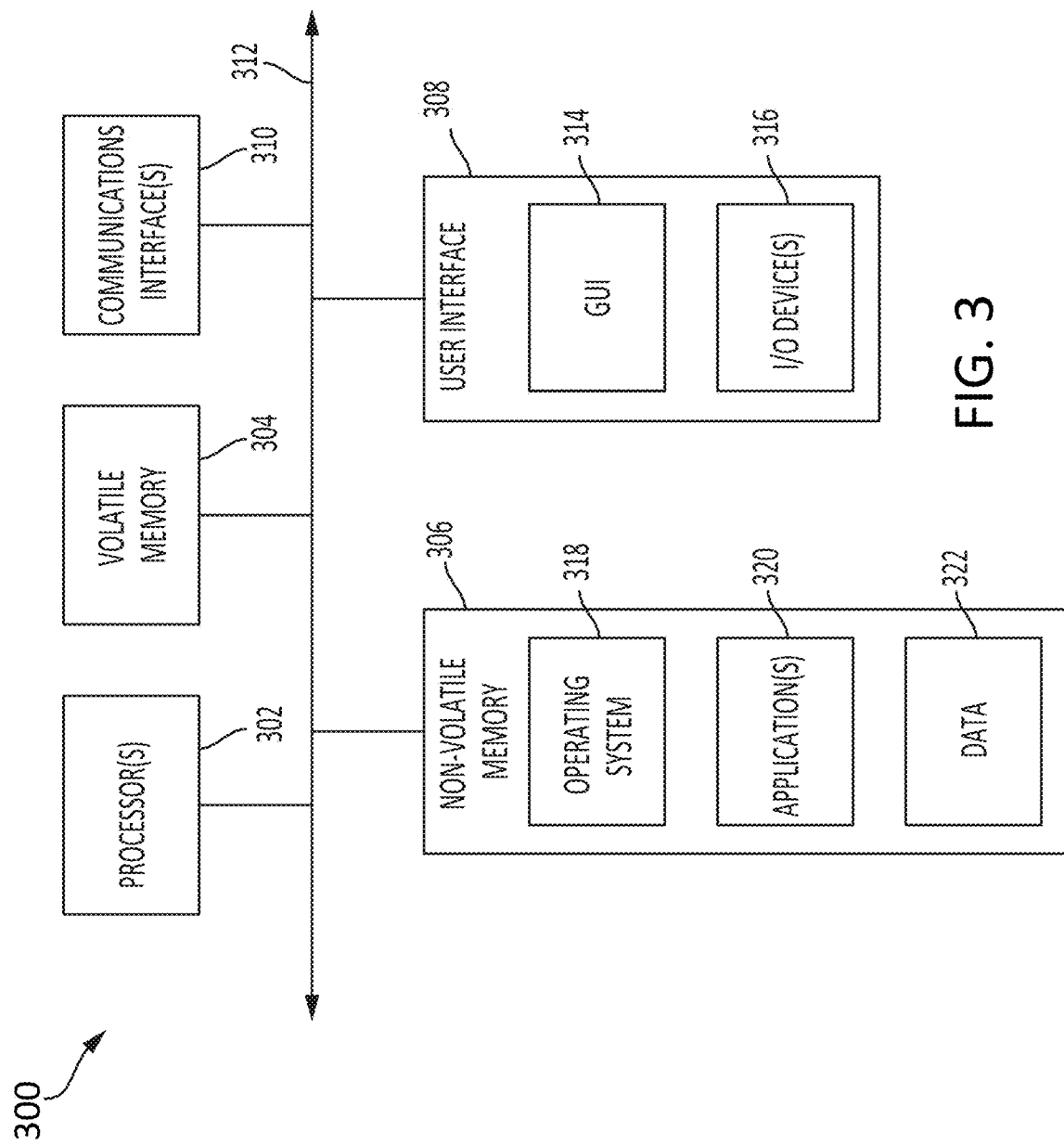
FIG. 3 is a block diagram of a computing system that may be used to implement one or more of the components of the computing environment shown in FIG. 2 in accordance with some embodiments.
Figure 4:
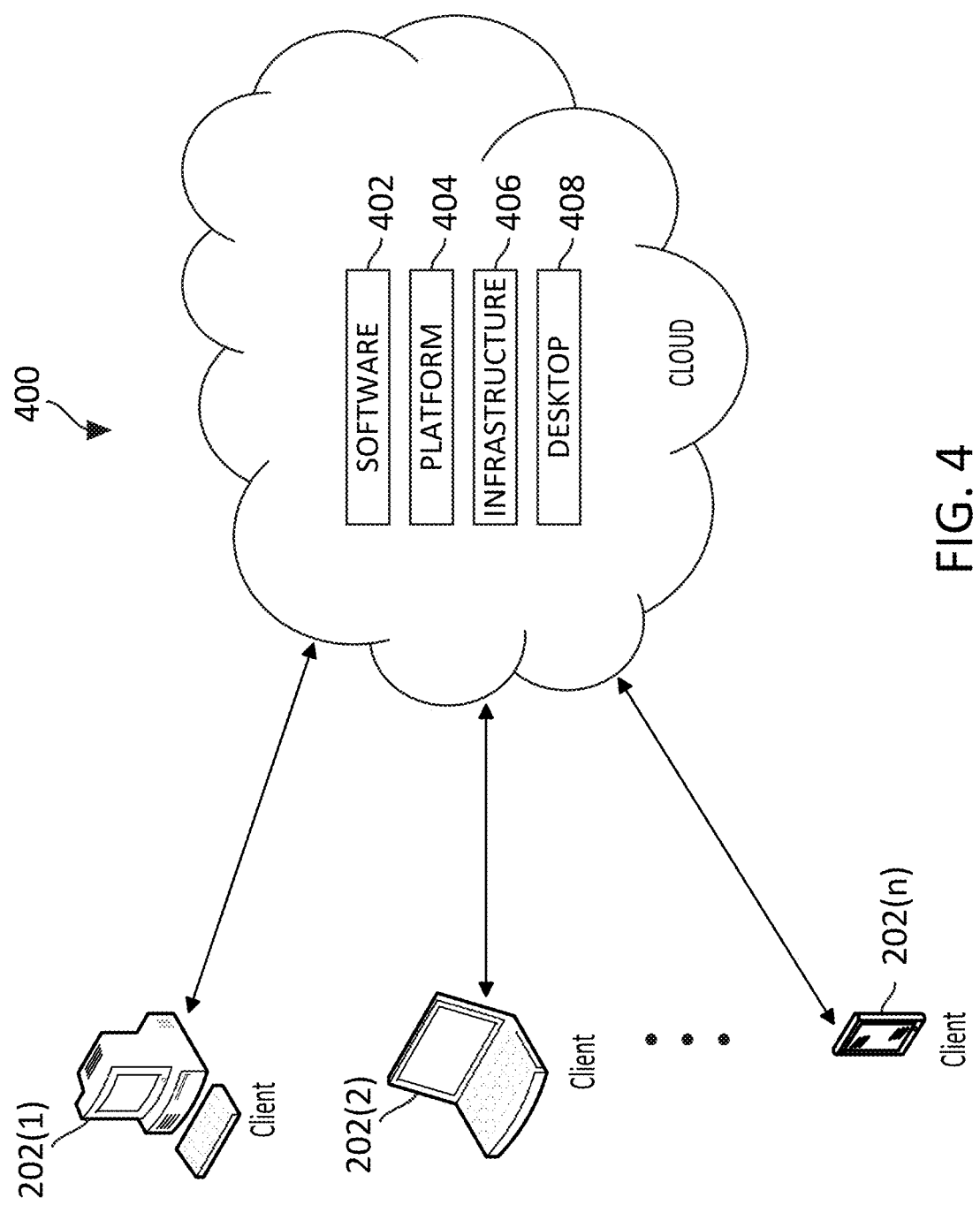
FIG. 4 is a schematic block diagram of a cloud computing environment in which various aspects of the disclosure may be implemented.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS).

Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

Figure 5A:
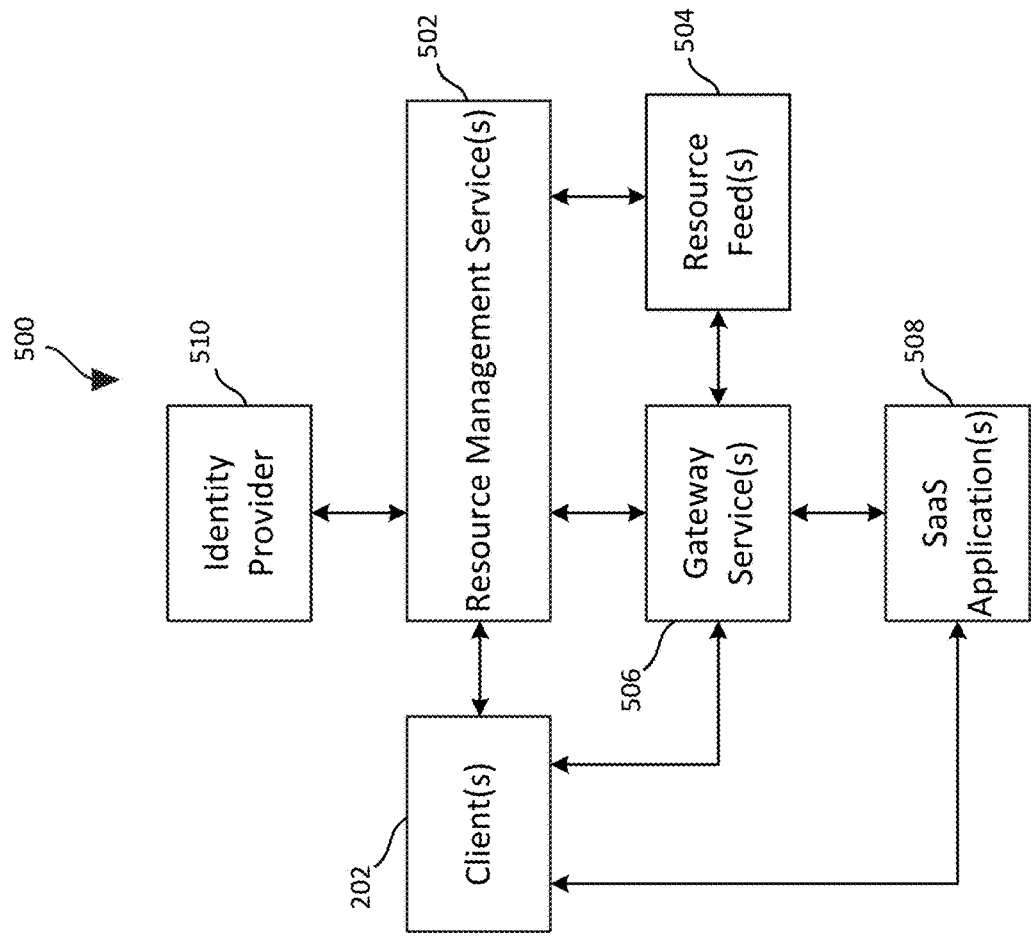
FIG. 5A is a block diagram of an example system in which resource management services may manage and streamline access by clients to resource feeds (via one or more gateway services) and/or software-as-a-service (SaaS) applications.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
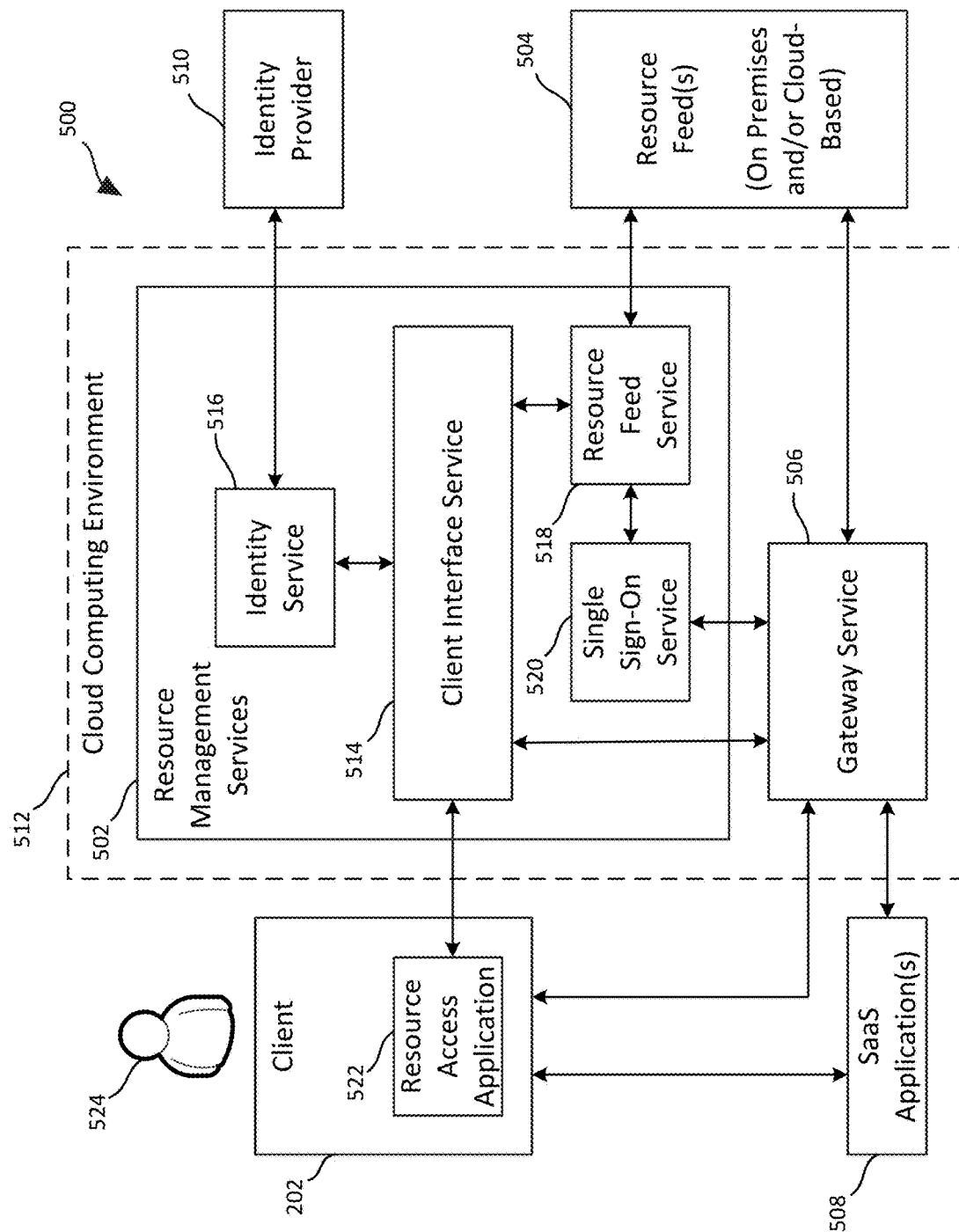
FIG. 5B is a block diagram showing an example implementation of the system shown in FIG. 5A in which various resource management services as well as a gateway service are located within a cloud computing environment.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource application is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

Figure 5C:
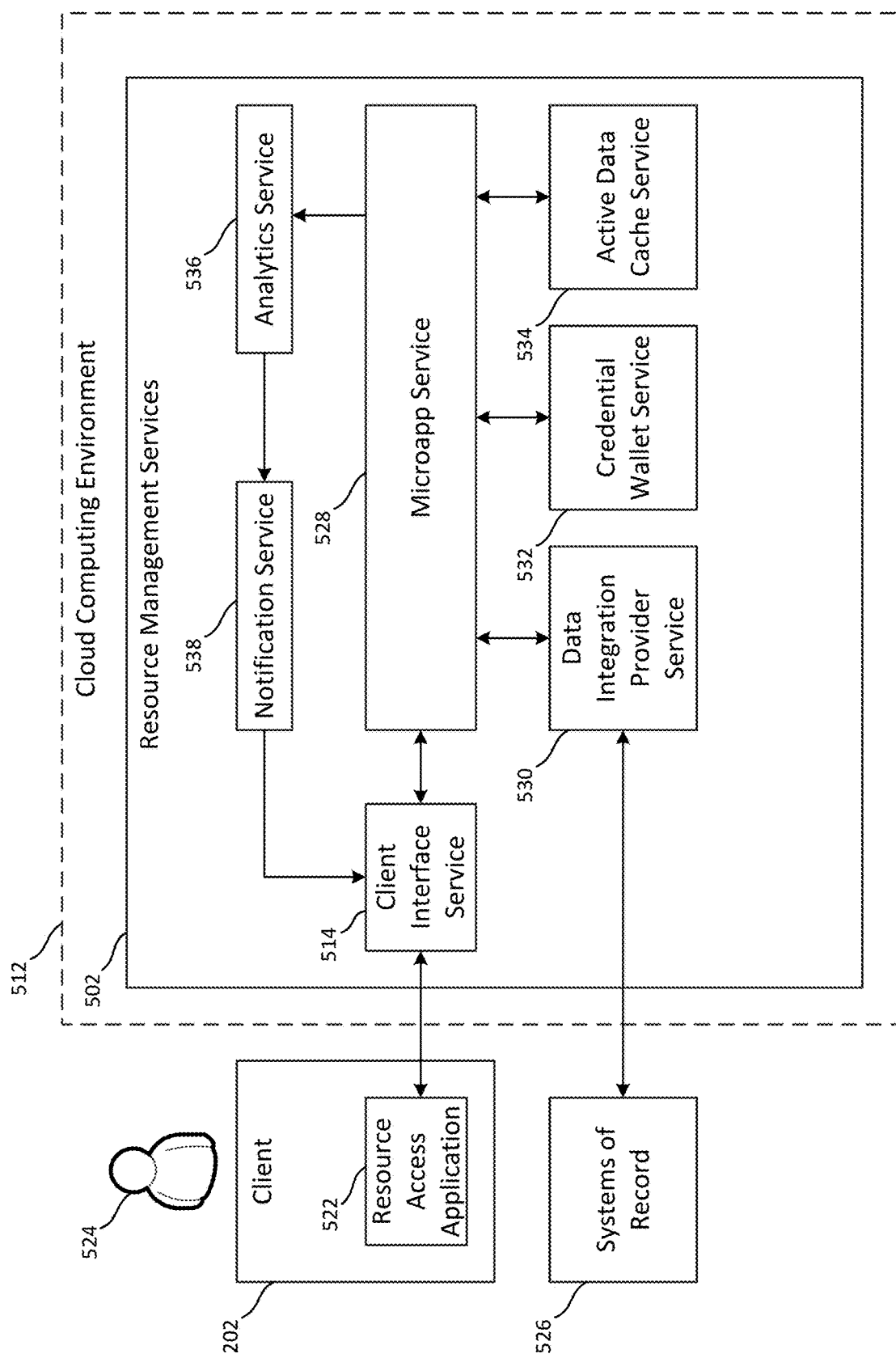
FIG. 5C is a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6ML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

Figure 5D:
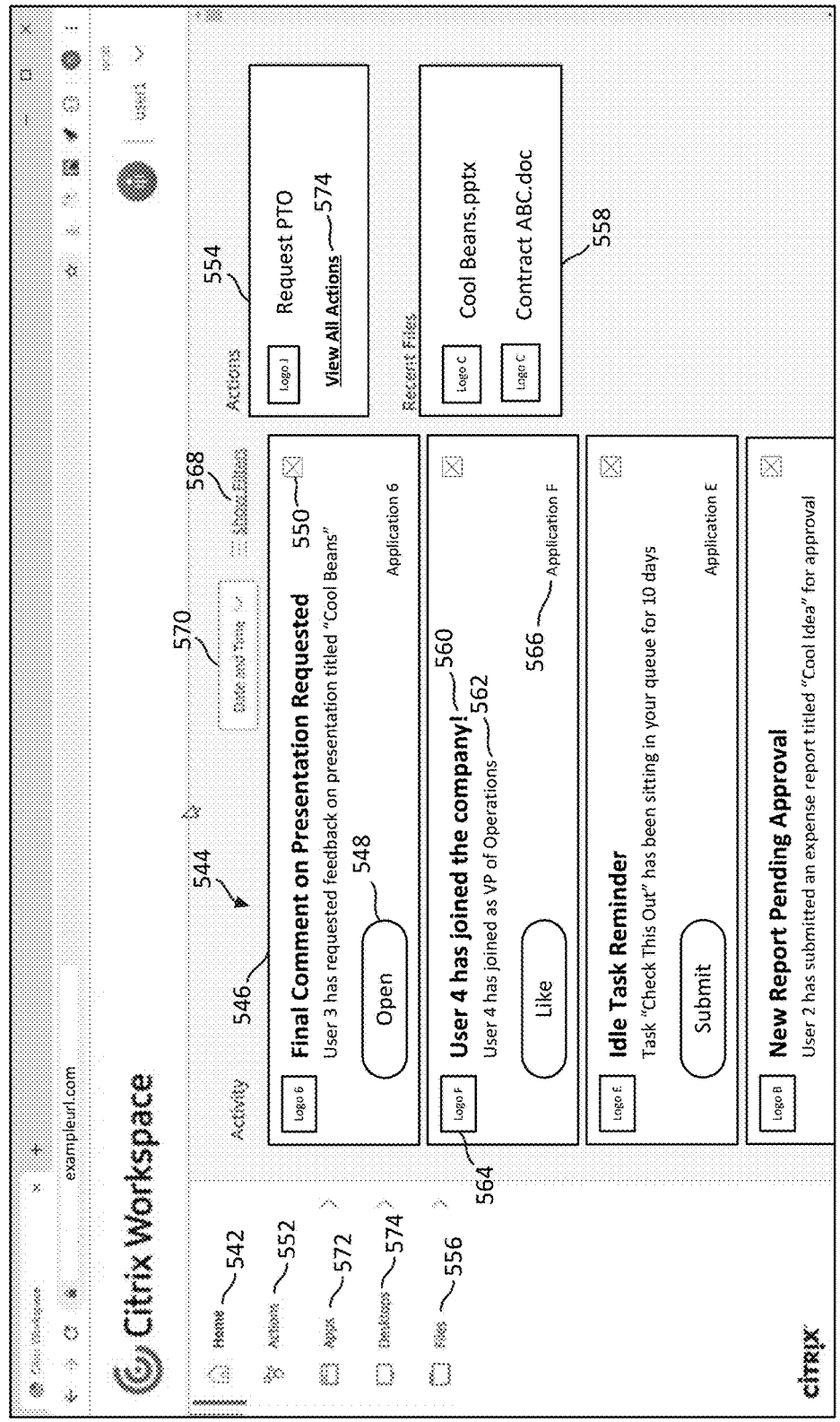
FIG. 5D shows how a display screen may appear when an intelligent activity feed feature of a multi-resource management system, such as that shown in FIG. 5C, is employed.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system of record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5I)), a "relevancy" mode (not illustrated) may be selected (e.g., using the element 570) in which the notifications may be sorted based on relevancy scores assigned to them by the analytics service 536, and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp.

In addition to the event-driven actions accessible via the action elements 548 in the notifications 546, a user may alternatively initiate microapp actions by selecting a desired action, e.g., via a drop-down menu accessible using the "action" user interface element 552 or by selecting a desired action from a list 554 of available microapp actions. In some implementations, the various microapp actions available to the user 524 logged onto the multi-resource access system 500 may be enumerated to the resource access application 522, e.g., when the user 524 initially accesses the system 500, and the list 554 may include a subset of those available microapp actions. The available microapp actions may, for example, be organized alphabetically based on the names assigned to the actions, and the list 554 may simply include the first several (e.g., the first four) microapp actions in the alphabetical order. In other implementations, the list 554 may alternatively include a subset of the available microapp actions that were most recently or most commonly accessed by the user 524, or that are preassigned by a system administrator or based on some other criteria. The user 524 may also access a complete set of available microapp actions, in a similar manner as the "action" user interface element 552, by clicking on the "view all actions" user interface element 574.

As shown, additional resources may also be accessed through the screen 540 by clicking on or otherwise selecting one or more other user interface elements that may be presented on the screen. For example, in some embodiments, the user may also access files (e.g., via a Citrix ShareFile® platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a Citrix Virtual Apps and Desktops™ service) by clicking on or otherwise selecting an "apps" user interface element 572 to reveal a list of accessible applications or by selecting a desired application from a list (not shown in FIG. 5D but similar to the list 558) of recently and/or commonly used applications. And still further, in some implementations, one or more desktops may additionally or alternatively be accessed (e.g., via a Citrix Virtual Apps and Desktops™ service) by clicking on or otherwise selecting a "desktops" user interface element 574 to reveal a list of accessible desktops or by or by selecting a desired desktop from a list (not shown in FIG. 5D but similar to the list 558) of recently and/or commonly used desktops.

The activity feed shown in FIG. 5D provides significant benefits, as it allows a user to respond to application-specific events generated by disparate systems of record without needing to navigate to, launch, and interface with multiple different native applications.

F. Detailed Description of Example Embodiments of the System for Providing Indications of Potentially Interesting Content During Online Meetings As described above in Section A, the present disclosure relates to providing indications of potentially interesting content during online meetings. As described in Section A, the computing system 100 may determine one or more keywords of interest for an online meeting presented via the user interface 104, may determine that content of the online meeting corresponds to a keyword of interest, and may cause the user interface 104 to output the indication 108 that content of the online meeting is potentially of interest. As also described in Section A, the computing system 100 may additionally or alternatively determine data indicative of a number of client devices 202 participating in an online meeting for which the user interface 104 for the online meeting is being presented in an active window, and may cause the first client device 202a to output the indication 109 that content of the online meeting is potentially of interest.

Figure 6A:
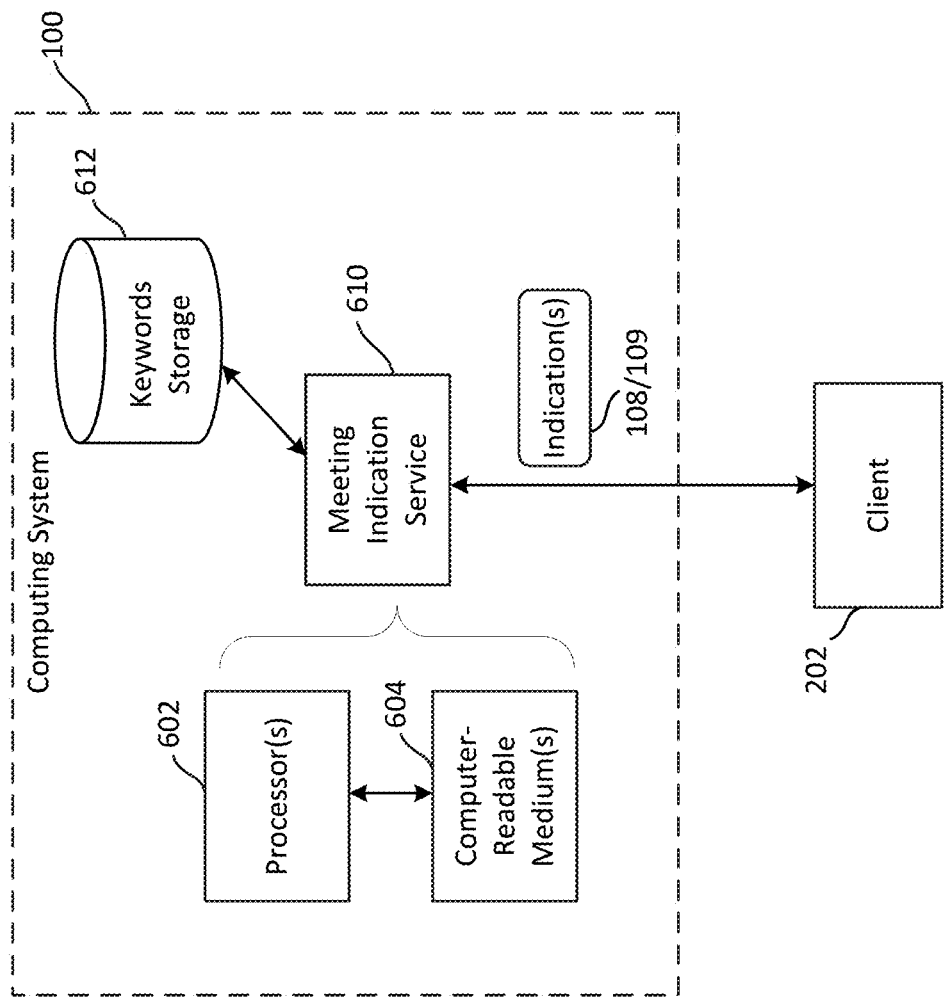
FIGS. 6A and 6B are block diagrams illustrating example components of one or more computing systems, shown in FIGS. 1A and 1C, for providing indications during an online meeting.

FIG. 6A is a block diagram illustrating example components that may be used to implement certain of the functionalities described herein. As shown in FIG. 6A, in some implementations, the computing system 100 may include one or more processors 602 as well as one or more computer-readable mediums 604 that are encoded with instructions to be executed by the processor(s) 602. In some implementations, such instructions may cause the processor (s) 602 to implement one or more, or possibly all, of the operations of the computing system 100 described herein.

The processor(s) 602 and computer-readable medium(s) 604 may be disposed at any of a number of locations within a computing network such as the network environment 200 described above (in Section B) in connection with FIG. 2. In some implementations, for example, the processor(s) 602 and the computer-readable medium(s) 604 embodying one or more of the components described herein may be located within one or more of the servers 204 and/or the computing system 300 that are described above (in Sections B and C) in connection with FIGS. 2 and 3, and/or may be located within a cloud computing environment 400 such as that described above (in Section D) in connection with FIG. 4.

As shown in FIG. 6A, in some implementations, the computing system 100 may include a meeting indication service 610. The meeting indication service 610 may be configured to determine that content of an online meeting corresponds to one or more keywords of interest and to cause the client device 202 to output the indication 108. The meeting indication service 610 may additionally or alternatively be configured to determine a number of client devices 202 participating in an online meeting with the user interface 104 presenting the online meeting in an active window, and to cause the client device 202 to output the indication 109.

In some implementations, the computing system 100 may also include a keywords storage 612 configured to store data associating keywords and online meetings, along with a user identifier for the user 102 and/or a client device identifier for the client device 202. The keywords storage 612 may store keywords provided by multiple different users 102 relating to multiple different online meetings. An online meeting may be identified, in the keywords storage 612, using a meeting identifier for the online meeting, a meeting application/system used to schedule the meeting, and/or other data related to the online meeting (e.g., name of person who scheduled the meeting, title of the meeting, time/date of the meeting, etc.). The keywords storage 612 may, for example, store text data representing the individual keywords.

In some implementations, the computing system 100 may be configured to provide online meeting capabilities. For example, the computing system 100 may include one or more other components that enable participation in the online meeting by multiple different users by receiving data from multiple client devices 202 and sending data to the client devices 202. The meeting indication service 610 may be included in such components or may work in conjunction with such components. For example, the meeting indication service 610 may use data indicative of content being presented during the online meeting, where such data may be received by the components enabling participation in the online meeting. In other implementations, the components enabling participation in the online meeting may be implemented outside of the computing system 100 (e.g., by another, separate computing system), and the computing system 100 may be in communication with such components.

Figure 6B:
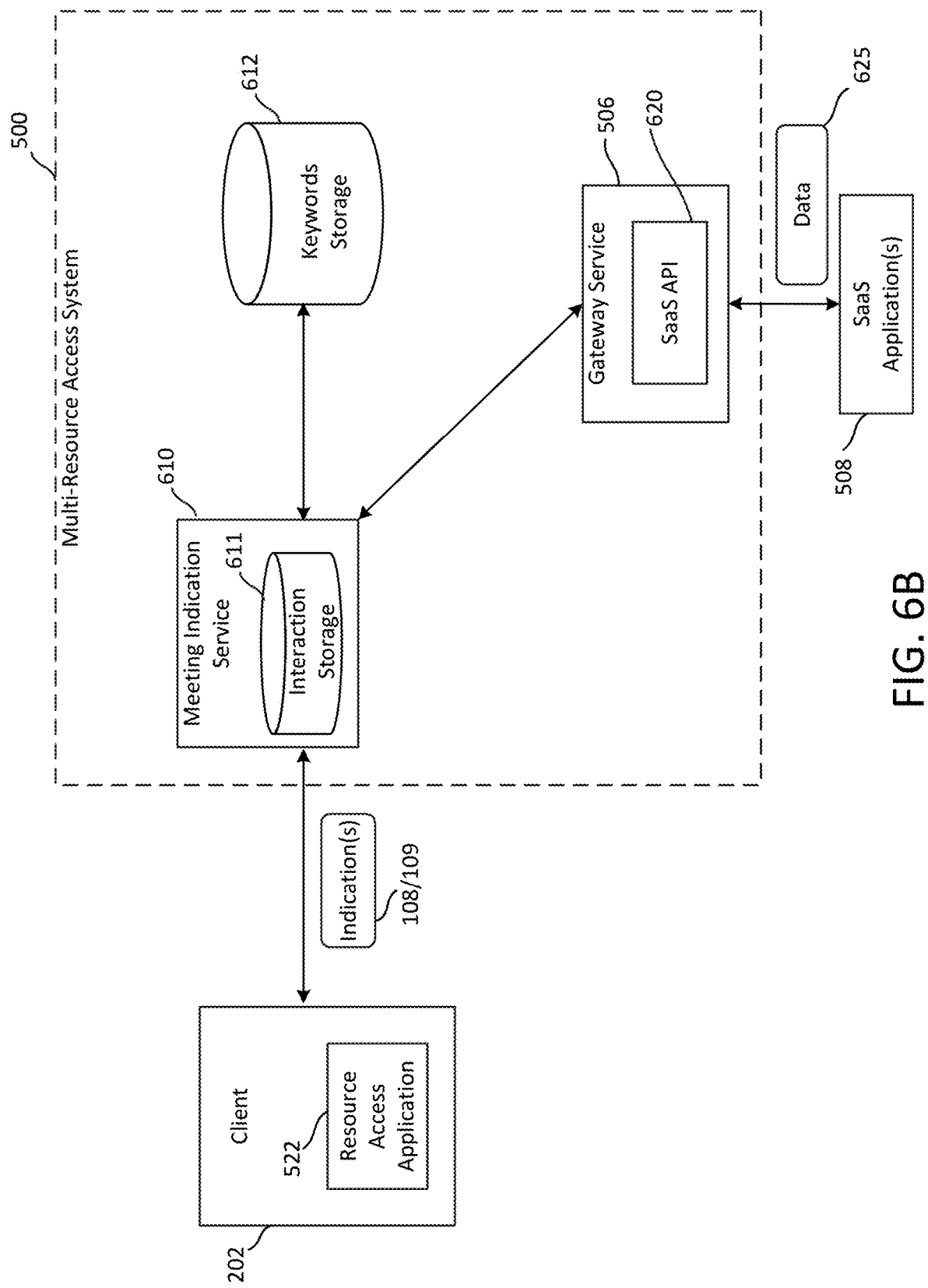

FIG. 6B is a block diagram illustrating other example components that may be used to implement certain of the functionalities described herein. As shown in FIG. 6B, in some implementations, the meeting indication service 610 may be implemented by the multi-resource access system 500 shown in FIGS. 5A-5C (and described above in Section E). In such implementations, an online meeting may be accessed at the client device 202 via the resource access application 522, which may enable access to one or more SaaS applications 508, as described in Section E, where the SaaS application 508 may provide capabilities for the online meeting. In some implementations, the gateway service 506 may include a SaaS API 620. Using the gateway service 506 and the SaaS API 620, the meeting indication service 610 may request, from the SaaS application 508 that is providing the online meeting, data representing the content being presented during the online meeting. Additionally, as shown, the keywords storage 612 may be included in the multi-resource access system 500. In other implementations, the multi-resource access system 500 may be in communication with the keywords storage 612.

In some implementations, the meeting indication service 610 may receive, from the client device 202 via the resource access application 522, data indicative of the user interface 104 being in an active window or an inactive window. Multiple client devices 202 may access the online meeting through the multi-resource access system 500 using their respective resource access applications 522. The meeting indication service 610 may be configured to receive data indicative of the user interface 104 being in an active window or inactive window from the multiple client devices 202 in communication with the multi-resource access system 500.

In some implementations, the indications 108/109 may be presented at the client device 202 via the resource access application 522. The indications 108/109 may, for example, be outputted as an overlay or a notification by the resource access application 522. In other implementations, the indications 108/109 may be outputted as an overlay within the specific window/application interface via which the online meeting is being accessed.

In some implementations, the meeting indication service 610 may be implemented at the client device 202, and may be part of a meeting application used to access an online meeting. In such implementations, the client device 202 may also include the keywords storage 612 or may be in communication with the keywords storage 612.

Figure 7:
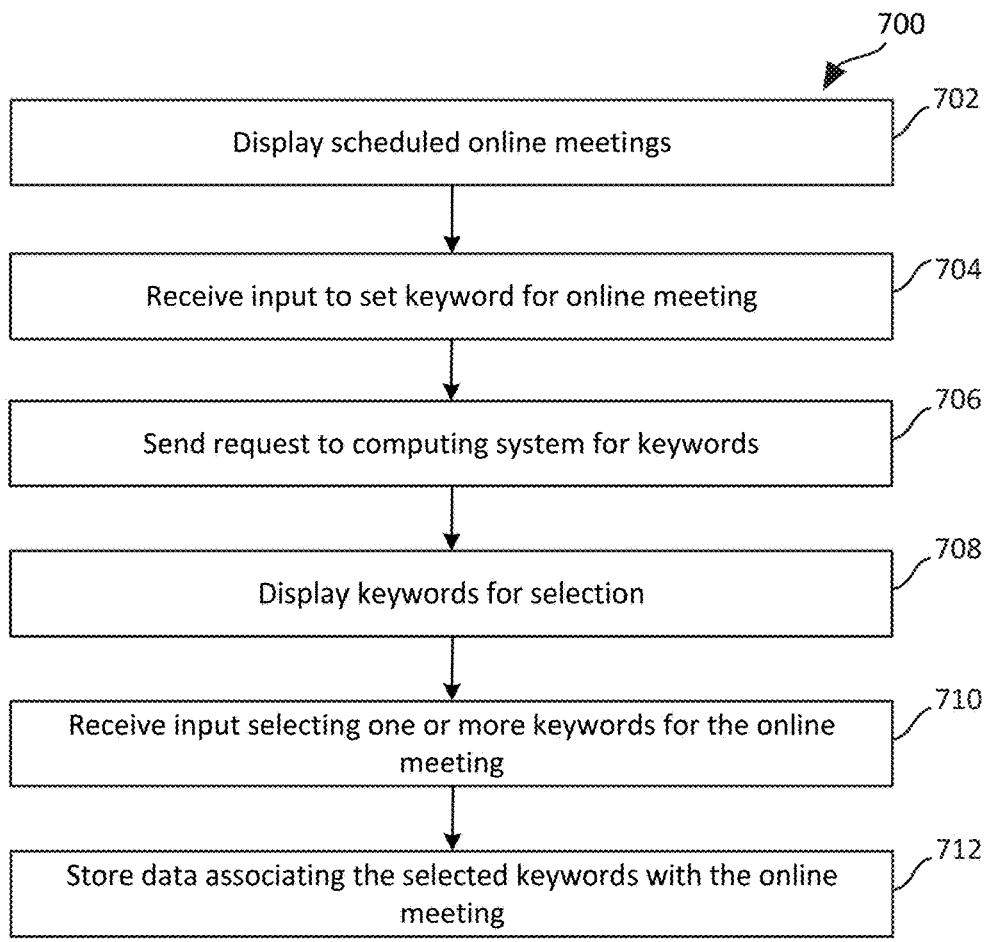
FIG. 7 is a flowchart of an example routine that may be performed by a client device according to an example implementation of the system shown in FIGS. 6A-6B.
Figure 9A:
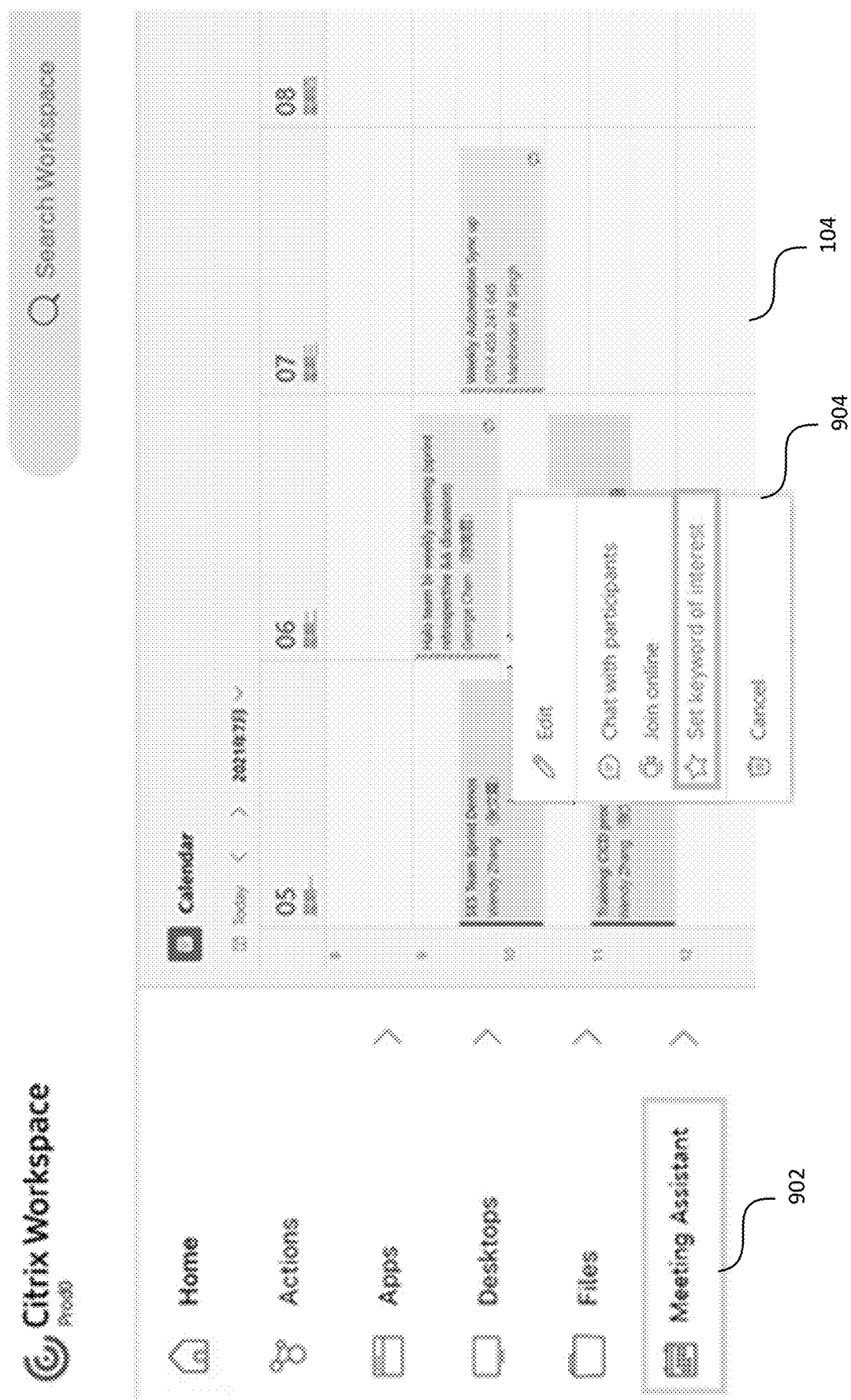
FIG. 9A shows an example user interface screen displaying a calendar showing online meetings.

FIG. 7 shows an example routine 700 that may be performed at the client device 202 to determine one or more appropriate keywords for an online meeting. The routine 700 may, for example, be performed by a meeting application, the resource access application 522 or another application (e.g., a scheduling or calendar application) at the client device 202. At a step 702, the client device 202 may display scheduled online meetings for the user 102. FIG. 9A shows an example user interface 104 displaying a calendar with one or more meetings, which may include online meetings. In other implementations, the online meetings may be displayed as a list, as part of an email or chat message, a notification, or other in another form.

In some implementations, the resource access application 522 may include a selectable user interface element 902 (shown in FIG. 9A), which may be labeled, for example, "meeting assistant." Selection of the element 902 may cause the resource access application 522 to display the calendar (shown in FIG. 9A) for the user 102 of the client device 202. The calendar may be populated based on the user 102 being authenticated by the multi-resource access system 500 as described in Section E.

At a step 704 of the routine 700, the client device 202 may receive an input to set a keyword for an online meeting. For example, an input, such as a mouse click, a keyboard input, a touch screen input, etc., may cause display of a menu or options (e.g., element 904 shown in FIG. 9A) for further actions that can be performed with respect to the online meeting. One example action may enable setting of a keyword for the online meeting, and the client device 202 may receive an input selecting that action.

At a step 706 of the routine 700, the client device 202 may send a request to a computing system for keywords. The client device 202 may send the request to the meeting indication service 610 at the computing system 100 or the multi-resource access system 500. In some embodiments, the meeting indication service 610 may be configured to determine keywords based on prior user interactions with one or more applications.

The meeting indication service 610 may be configured to process interactions by the user 102 with one or more SaaS applications 508 or other applications to determine keywords for a subject matter of interest. The determined keywords may be presented for selection for an online meeting. To process interactions with the SaaS application(s) 508, the meeting indication service 610 may be in communication with the gateway service 506 (described above in Section E). In some implementations, the gateway service 506 may include a SaaS API 620, which may enable one or more components of the multi-resource access system 500 to communicate with the SaaS application(s) 508. In some implementations, the SaaS API 520 may be included outside of the gateway service 506 as a separate component or within another component of the computing system 100. The meeting indication service 610 may use the SaaS API 620 to retrieve data 625, indicative of interactions, from the SaaS application(s) 508, which can be used to determine keywords. The data 625 may represent actions the user 102 performed via the SaaS application(s) 508, where such actions may include, but are not limited to, exchanging communications with other users (e.g., sending emails, receiving emails, sending messages, receiving messages, posting/sending comments, receiving comments, etc.). The actions may also include opening, sharing or otherwise accessing files. The remainder of the routine 700 will be described below, following a description of an example process for evaluating user interactions with SaaS application(s) 508 to determine keywords.

Figure 8:
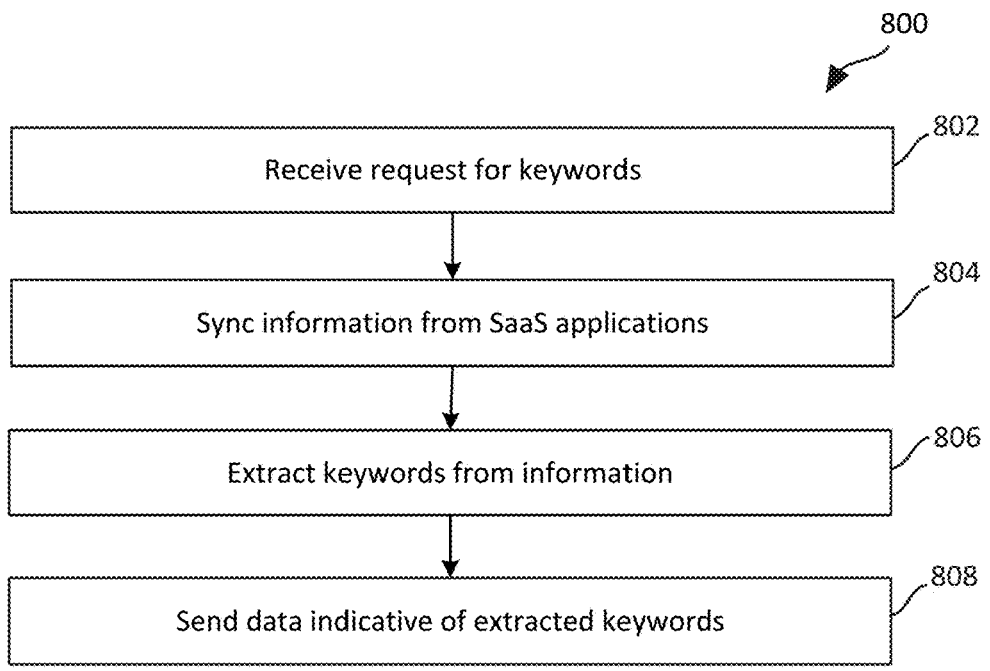
FIG. 8 is a flowchart of an example routine that may be performed by the meeting indication service shown in FIGS. 6A-6B.

FIG. 8 shows an example routine 800 that may be performed by the meeting indication service 610 to determine keywords based on interactions with the SaaS application(s) 508. At a step 802 of the routine 800, the meeting indication service 610 may receive a request for keywords, which may be the request sent by the client device 202 in the step 706 of the routine 700. In response to receiving the request, at a step 804, the meeting indication service 610 may sync information from the SaaS application(s) 508. The meeting indication service 610 may request, using the SaaS API 620, the data 625, indicative of interactions, from the SaaS application(s) 508. In some implementations, the meeting indication service 610 may use separate API calls for the separate/different SaaS applications 508. For example, the meeting indication service 610 may send a first API call to retrieve data from a first SaaS application 508*a* (e.g., Microsoft Teams), a second API call to retrieve data from a second SaaS application 508*b* (e.g., Slack), a third API call to retrieve data from a third SaaS application 508*c* (e.g., Microsoft Outlook), and so on. The meeting indication service 610 may request the data 625 from some or all of the SaaS applications 508 that the user 102 is authorized to access via the resource access application 522. In some implementations, as described above in Section E, the resource management services 502 may be configured to use stored access credentials associated with the user 102 (or system administrator) to enable access to the SaaS application(s) 508, e.g., via one or more APIs.

In response to the API calls, the SaaS application(s) 508 may send the data 625 indicative of interactions by the user 102 with the SaaS application(s) 508. In some implementations, the gateway service 506 may act as an intermediary between the meeting indication service 610 and the SaaS applications 508. That is, the meeting indication service 610 may send the API calls via the gateway service 506, and the meeting indication service 610 may receive the data 625 via the gateway service 506.

The data 625 may be emails between the user 102 and other users, messages (e.g., instant messages, chat messages, text messages, etc.) between the user 102 and the other users, posts/comments made by the user 102, files accessed (e.g., uploaded, downloaded, modified, shared, opened, created, etc.) by the user 102, and the like.

The meeting indication service 610 may include an interaction storage 611 (or may be in communication with a storage) that may store the data 625. The interaction storage 611 may be refreshed/updated on a periodic basis (e.g., once a day, every other day, etc.), so that the data 625 reflects recent interactions, and thus relate to current subject matters of interest. The data 625 may relate to a particular time period (e.g., past month, past week, etc.). Based on receiving the data 625, the meeting indication service 610 may sync/update the information at the interaction storage 611.

At a step 806 of the routine 800, the meeting indication service 610 may extract keywords from the information from the SaaS application(s) 508. The meeting indication service 610 may use one or more techniques to determine the keywords from the data 625 indicative of interactions. In some implementations, for example, the meeting indication service 610 may implement one or more machine learning models to extract the keywords. In an example embodiment, the meeting indication service 610 may use a Latent Dirichlet Allocation (LDA) technique to derive keywords from the data 625. Another technique may involve determining a word (e.g., a noun) as being a keyword based on how often the word appears in the data 625. Yet another technique may involve topic/subject matter determination from the data 625.

In some implementations, a machine learning model may be trained, using training data, to extract keywords. The training data may, for example, be based on a document data set including multiple different sample interactions with different SaaS applications 508. For example, the document data set may include multiple sample emails between different users, multiple sample chat messages between different users (e.g., from an instant messaging application), multiple sample posts/comments by different users within project management application, etc. In some embodiments, the document data set may be filtered to remove words that may not indicate a subject matter or topic (e.g., words like "is", "are", "were", etc.). In some implementations, the document data set may be filtered to remove a predefined set of words (e.g., a stop word list), which may be defined, for example, by a system administrator. A segmentation method may be used to determine portions of the document data set for processing. In example embodiments, the segmentation method may segment the document data set based on individual sentences. In other embodiments, the segmentation method may additionally or alternatively segment the document data set based on individual words. The filtered segmented document data set may be stored and used as the training data for the machine learning model.

In some implementations, the meeting indication service 610 or another component of the computing system 100 may perform the steps to train the machine learning model. In other implementations, another computing system may perform the steps to train the machine learning model, and may provide the trained model to the meeting indication service 610 for use.

In some implementations, the meeting indication service 610 may extract keywords from the data 625 prior to receiving the request for keywords (in step 802). The extracted keywords may be stored, for example, in the keywords storage 612 or another data storage.

In addition to the keywords determined from the data 625 indicative of interactions with the SaaS application(s) 508, the meeting indication service 610 may determine other keywords. In some implementations, the meeting indication service 610 may determine recently used/selected keywords for the user 102 or the client device 202.

At a step 808 of the routine 800, the meeting indication service 610 may send, to the client device 202, data indicative of the determined keywords. The data may be sent in response to the request received in step 802 of the routine 800 and sent in step 706 of the routine 700.

Figure 9B:
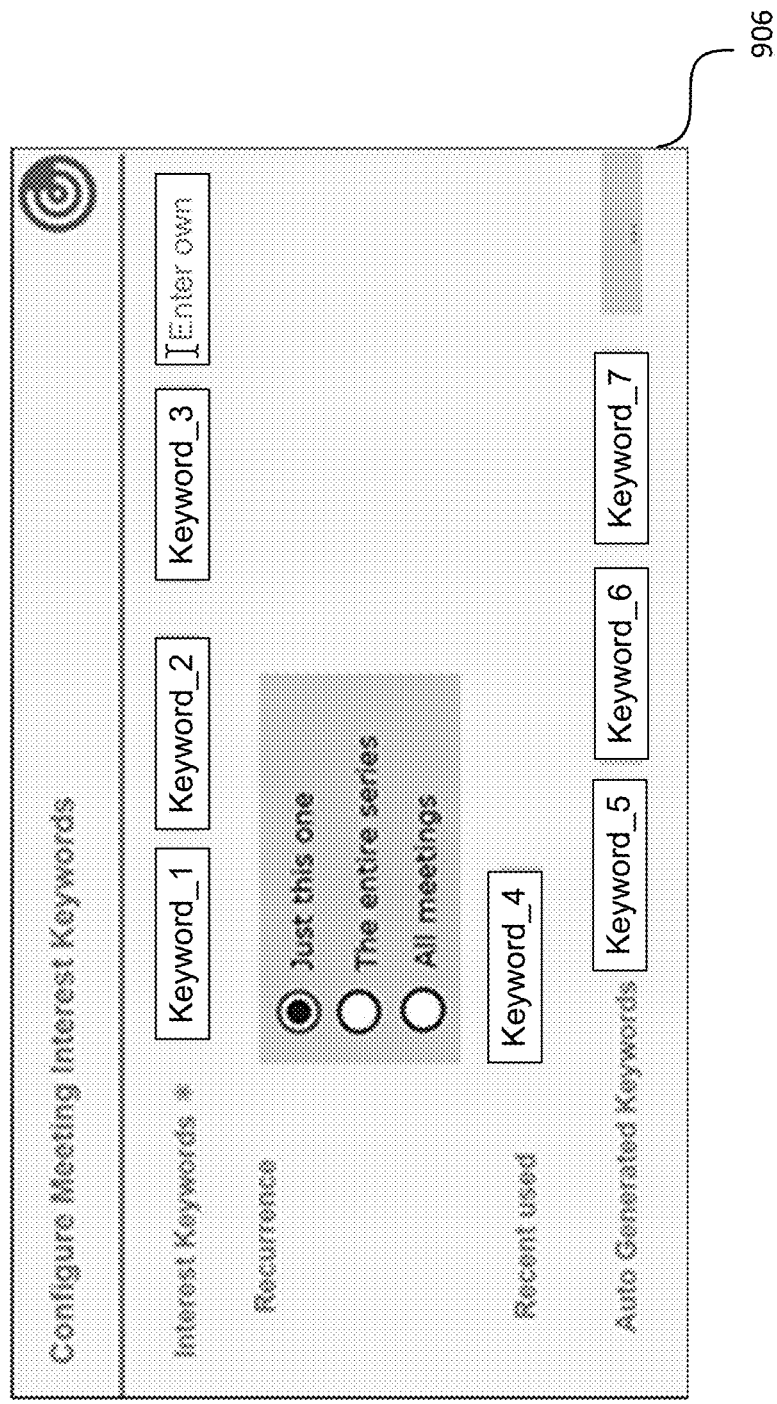
FIG. 9B shows an example user interface screen that enables selection of a keyword for an online meeting.

Referring back to the routine 700 shown in FIG. 7, at a step 708, the client device 202 may display keywords for selection. The client device 202 may display the keywords based on data received from the meeting indication service 610 per the step 808 of the routine 800. The client device 202 may display the keywords, for example, as shown in FIG. 9B. As shown, a user interface screen 906 may display "auto generated keywords," which may be the keywords extracted from the data 625. The user interface screen 906 may also display "recently used" keywords.

At a step 710 of the routine 700, the client device 202 may receive an input selecting one or more keywords for the online meeting (selected in the step 704). The client device 202 may receive one or more mouse clicks, keyboard inputs, touchscreen inputs, and the like, selecting one or more of the displayed keywords. As shown in FIG. 9B, the selected keywords may be shown as "keywords of interest." Additionally or alternatively, the client device 202 may receive an input representing a keyword that may not be displayed in the user interface screen 906. For example, the user 102 may type (e.g., via a keyboard, a touchscreen, etc.) a keyword of interest.

At a step 712 of the routine 700, the client device 202 may cause storage of data associating the selected keywords (based on the input received in step 710) with the online meeting. The client device 202 may send data indicative of the selected keywords to the meeting indication service 610, which in turn may store, in the keywords storage 612, data associating the selected keywords with the online meeting. The online meeting may be identified, in the keywords storage 612, using a meeting identifier, a meeting application used to schedule the online meeting, a title of the meeting, a name of the person that scheduled the meeting, or other data. The keywords storage 612 may store a data record associating the online meeting with the selected keywords, where the keywords may be represented as text data. Additionally, a user identifier for the user 102 and/or a device identifier for the client device 202 may also be associated with the online meeting and keywords, such as to identify the user/client device for which the keywords are of interest.

Figure 10:
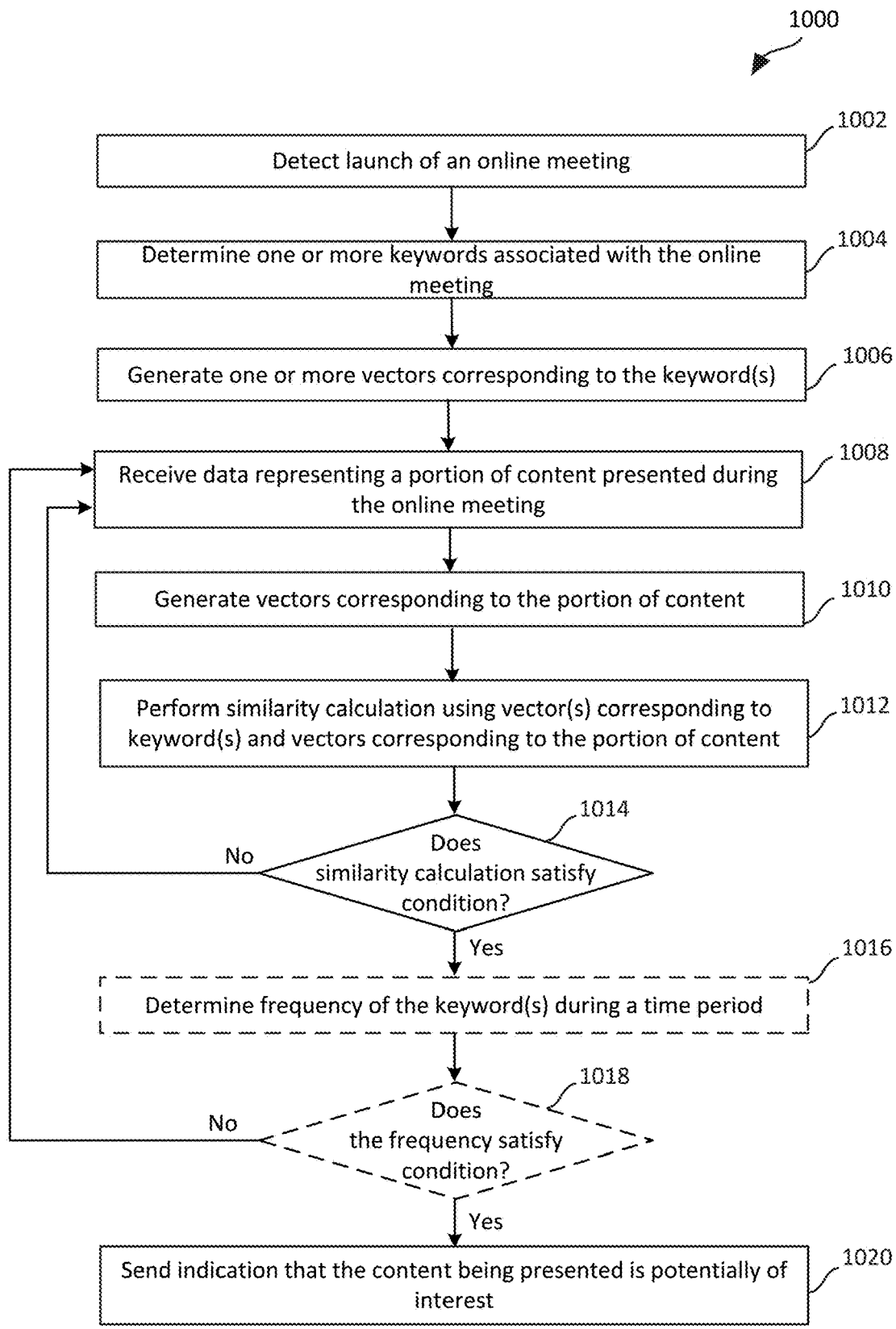
FIG. 10 is a flowchart of another example routine that may be performed by the meeting indication service shown in FIGS. 6A-6B.

FIG. 10 shows an example routine 1000 that may be performed by the meeting indication service 610 to provide an indication of when meeting content corresponds to one or more keywords. At a step 1002, the meeting indication service 610 may detect launch of an online meeting at the client device 202 via the user interface 104. In some implementations, the online meeting may be launched using a meeting application (e.g., an application installed at the client device 202 or via a web browser option for the meeting application) at the client device 202, in which case the user interface 104 may be provided by the meeting application. In other implementations, the online meeting may be launched using the resource access application 522, via the SaaS application 508 that enables capabilities for the online meeting. In such implementations, the user interface 104 may be provided by the resource access application 522. The meeting indication service 610 may receive, from the client device 202, data indicative of the launched online meeting, where the data may include meeting identifying data for the online meeting (e.g., a meeting identifier, a meeting name, a meeting application used to schedule the online meeting, a name of the person who scheduled the meeting, time/date of the meeting, title of the meeting, etc.). The client device 202 may send the data in response to the online meeting being launched at the client device 202, and the meeting indication service 610 may detect launch of the online meeting using the received data.

At a step 1004 of the routine 1000, the meeting indication service 610 may determine one or more keywords associated with the online meeting. The meeting indication service 610 may make this determination using the data identifying the launched online meeting and the data stored in the keywords storage 612, and possibly also using a user identifier for the user 102 and/or a device identifier for the client device 202 (which may be received from the client device 202). For example, as described above in relation to FIGS. 7 and 9A-9B, one or more keywords may be associated with an online meeting based on input(s) received at the client device 202, and the keywords storage 612 may store data accordingly.

At a step 1006 of the routine 1000, the meeting indication service 610 may generate one or more vectors corresponding to the keyword(s). The meeting indication service 610 may, for example, use one or more techniques to determine such vectors. One technique involves using one or more machine learning models that generate a vector representation for a word (e.g., a word embedding). In some implementations, the meeting indication service 610 may use a word2vec technique that generates a 300-dimension vector for a word. The meeting indication service 610 may generate a vector for individual keywords, and the vectors corresponding to the keywords may be a set of vectors. In some implementations, the vector(s) may be precomputed, where the meeting indication service 610 may determine the vector(s) for the keyword(s) when the keyword(s) for the online meeting are received, for example, after the step 710 or 712 of the routine 700. In such implementations, the vector(s) corresponding to the keyword(s) may be stored in the keywords storage 612.

At a step 1008 of the routine 1000, the meeting indication service 610 may receive data representing a portion of content being presented during the online meeting. The portion of content may correspond to a time duration (e.g., "30" seconds, "1" minute, "5" minutes, etc.). Data representative of the content may, for example, be sent by the client device 202 to the meeting indication service 610. In other implementations, the data representative of the content may be sent by the SaaS application 508 providing the online meeting. In yet other implementations, the data representative of the content may be sent by another computing system (e.g., a server 204) providing the online meeting. In still other implementations, e.g., where the online meeting is provided by the computing system 100, the data representative of the content may be sent by one or more components within the computing system 100 to the meeting indication service 610.

The content of the online meeting may include speech from one or more participants (e.g., the user 102 and/or other users) of the online meeting, which may be captured as audio data. In some implementations, the speech/audio data from the participants may be converted to text data prior to being communicated to the meeting indication service 610. In other implementations, the meeting indication service 610 may convert the audio data to text data using automatic speech recognition techniques and/or speech-to-text techniques (e.g., an acoustic model, a language model, a recurrent neural network (RNN), a RNN-transformer model, an encoder-decoder architecture, etc.). The audio data and/or the text data may be determined based on voice inputs provided by the participants of the online meeting via their respective client devices 202. The content of the online meeting may additionally or alternatively include information shared by the participants using a screen share feature, which may involve displaying of text and/or images. The meeting indication service 610 or the component providing the online meeting may process the shared information (text and/or images) using computer vision techniques, optical character recognition (OCR) techniques, or other techniques to understand the information being shared. Further, the content of the online meeting may additionally or alternatively include non-speech audio (e.g., music, recorded audio, etc.), video, chat messages, and other types of inputs that may be provided by the participants of the online meeting. The data received in the step 1008 of the routine 1000 may include audio data, text data, image data, etc.

At a step 1010 of the routine 1000, the meeting indication service 610 may generate vectors corresponding to the portion of the content (received in the step 1008). The meeting indication service 610 may use similar techniques as described above in relation to the step 1004 of the routine 1000 to generate the vectors. The meeting indication service 610 may generate a vector for individual words in the portion of the content. In some implementations, the meeting indication service 610 may then determine a vector for individual sentences in the content. The vector for the sentence may be a set of vectors for the words in the sentence. The vector for the sentence may be determined by combining (e.g., aggregating, averaging, concatenating, etc.) the vectors for the words in the sentence. The meeting indication service 610 may then determine a vector for the portion of the content based on the vectors for different sentences in the portion of the content.

At a step 1012 of the routine 1000, the meeting indication service 610 may perform a similarity calculation using the vector(s) corresponding to the keyword(s) (generated in the step 1006) and the vectors corresponding to the portion of the content (generated in the step 1010). In performing the similarity calculation, the meeting indication service 610 may determine whether the keyword is mentioned or included in the portion of the content. The meeting indication service 610 may use any of a number of suitable techniques to calculate the similarity. One such technique may involve calculating a cosine similarity using the vectors.

In some implementations, the meeting indication service 610 may determine a similarity value indicating how similar (e.g., based on a vector comparison) the portion of the content is to the keyword(s) associated with the online meeting. In some implementations, the similarity value may be a likelihood or probability of the keyword being similar to the portion of the content based on a comparison of the vector corresponding to the keyword and the vectors corresponding to the content. The similarity value may be based on individual keywords associated with the online meeting. For example, the meeting indication service 610 may determine a first similarity value indicative of a first keyword associated with the online meeting being similar to the portion of the content, a second similarity value indicative of a second keyword associated with the online meeting being similar to the portion of the content, etc.

At a decision step 1014 of the routine 1000, the meeting indication service 610 may determine whether the similarity calculation satisfies a condition. The condition may, for example, be a threshold similarity value to determine whether the portion of the content corresponds to (e.g., mentions, includes, etc.) the keyword(s). If the similarity calculation does not satisfy the condition (e.g., is below the threshold similarity value), then the routine 1000 may return to the step 1008 and the meeting indication service 610 may receive data representing another portion of the content presented during the online meeting. The other portion of the content may correspond to the next time duration, for example, the next "30" seconds, next "1" minute, next "5" minutes, etc. of the online meeting.

If the similarity calculation does satisfy the condition in the decision step 1014 (e.g., is above the threshold similarity value), then at an optional step 1016 of the routine 1000, the meeting indication service 610 may determine a frequency of the keyword(s) during a time period. The meeting indication service 610 may track a number of times respective keywords are mentioned/included in the content of the online meeting. Such tracking may be based on a number of vectors corresponding to the portion of the content (generated in the step 1010) that is similar to the keyword(s). Additionally, such tracking may be based on prior portions of the content mentioning/including the keyword(s). For example, the portion of the content (received in the step 1008) may correspond to "1" minute of the online meeting, and based on performing the steps 1010-1014 with respect to the portion of the content, the meeting indication service 610 may determine that a keyword was spoken by a participant of the online meeting three times during the "1" minute. As another example, based on performing the steps 1010-1014 with respect to a "1" minute portion of the online meeting, the meeting indication service 610 may determine that a keyword was spoken once during that "1" minute portion, and based on performing the steps 1010-1014 with respect to the next "1" minute portion of the online meeting, the meeting indication service 610 may determine that the keyword was spoken once during that "1" minute portion, thus totaling to the keyword having been spoken twice during a "2" minute period of the online meeting (or the keyword having been spoken once/minute for "2" minutes of the online meeting). Thus, the frequency of the keyword(s) may represent the number of times, during a time period, a keyword was mentioned/included in the content of the online meeting.

In some implementations, the meeting indication service 610 may provide an indication that the content being presented is potentially of interest based on a keyword being mentioned/included at least a minimum number of times during a time period. At an optional decision step 1018 of the routine 1000, the meeting indication service 610 may determine whether the frequency of the keyword(s) satisfies a condition. The condition may be a threshold frequency value. If the frequency does not satisfy the condition (e.g., is below the threshold frequency value), then the routine 1000 may return to the step 1008 and the meeting indication service 610 may receive data representing another portion of the content presented during the online meeting. The other portion of the content may correspond to the next time duration, for example, the next "30" seconds, next "1" minute, next "5" minutes, etc., of the online meeting.

If the frequency satisfies the condition in the decision step 1018 (e.g., is above the threshold frequency value), then at a step 1020 of the routine 1000, the meeting indication service 610 may send the indication 108 that the content being presented is potentially of interest. The meeting indication service 610 may send the indication 108 based on the portion of the content corresponding to the keyword(s) associated with the online meeting. The meeting indication service 610 may send the indication 108 to the client device 202. In other implementations, the meeting indication service 610 may additionally or alternatively send the indication 108 to another client device 202 (that is not presenting the online meeting) of the user 102 (e.g., a smartphone, a tablet, a smartwatch, etc.), in case the user 102 is away from the client device 202 (shown in FIG. 1A) that is presenting the online meeting.

Sending of the indication 108 may cause the user interface 104 to present the indication 108. The indication 108 may, for example, be a pop-up dialog box as shown in FIG. 1B, which may be displayed within the user interface 104. In some implementations, the indication 108 may be overlaid on top of the online meeting content as shown in FIG. 1B. In other implementations, the indication 108 may be presented in such a manner that the indication 108 is overlaid on top of any content that is actively being displayed at the client device 202, so that the indication 108 is visible to the user 102 even when a window/application presenting the online meeting is minimized or in the background. In other implementations, sending of the indication 108 may cause the window/application presenting the online meeting, which may have been previously minimized or in the background, to become maximized or brought to the foreground, so that both the indication 108 and the online meeting are visible to the user 102.

In some implementations, as shown in FIG. 1B, the indication 108 may include a number of times a keyword was mentioned/included during a time period. Such information may be based on the frequency of the keyword(s) determined during the step 1016 of the routine 1000.

In some implementations, the indication 108 may additionally or alternatively include an audible indication, such as a chime, a beep, or other sound that may be outputted via one or more speakers of the client device 202. In some implementations, in addition to or in lieu of a pop-up dialog box, the indication 108 may include an image or other graphical user interface element. In some implementations, the indication 108 may additionally or alternatively be presented via a user interface other than the user interface 104, such as by way of a notification menu/bar provided by an operating system of the client device 202 or by the resource access application 522.

Figure 11:
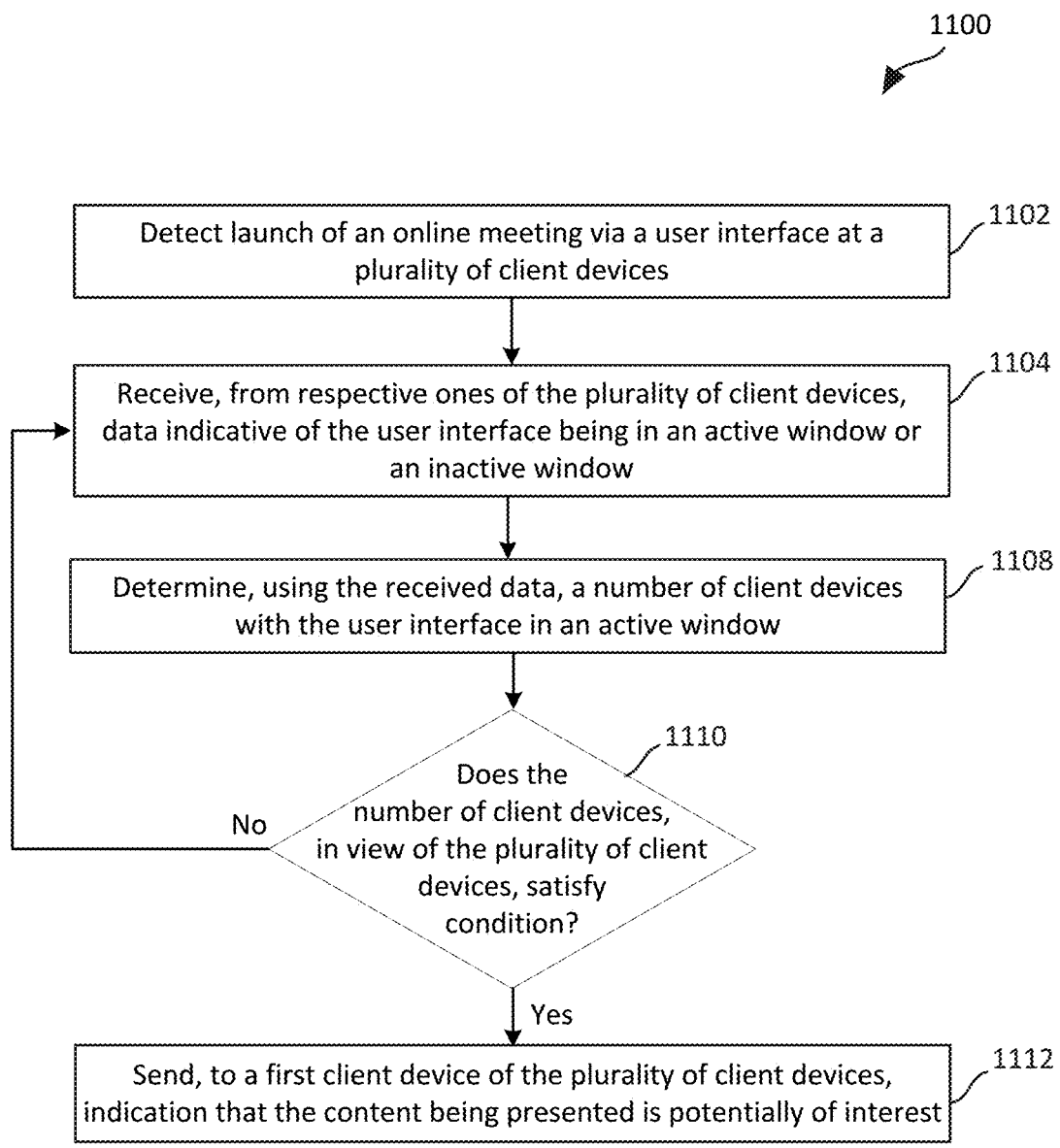
FIG. 11 is a flowchart of another example routine that may be performed by the meeting indication service shown in FIGS. 6A-6B.

FIG. 11 shows an example routine 1100 that may be performed by the meeting indication service 610 to provide an indication based on a number of client devices with their respective user interfaces presenting the online meeting in an active window. At a step 1102, the meeting indication service 610 may detect launch of an online meeting via the user interface 104 at the plurality of client device 202. Multiple client devices 202 may be in communication with the meeting indication service 610, and the respective client devices 202 may send data (e.g., a meeting identifier, a meeting name, a meeting application used to schedule the online meeting, a name of the person who scheduled the meeting, time/date of the meeting, title of the meeting, etc.) identifying the launched online meeting. The online meeting may be launched, at the individual client devices 202, using a meeting application (e.g., an application installed at the client device 202 or via a web browser option for the meeting application) or using the resource access application 522 (e.g., via the SaaS application 508 that enables capabilities for the online meeting). The meeting indication service 610 may detect launch of the online meeting at the plurality of client devices 202 using the received data.

At a step 1104 of the routine 1100, the meeting indication service 610 may receive, from individual ones of the plurality of client devices 202, data indicative of the user interface 104 being in an active window or an inactive window. The meeting indication service 610 may determine that the online is being presented in an active window of a client device 202, for example, when the user interface 104 is presently fully visible via a screen of the client device 202, or when the user interface 104 is in a foreground window at the client device 202. The meeting indication service 610 may determine that the online meeting is being presented in an inactive window when the user interface 104 is minimized or is covered by another user interface, window or content different than the online meeting, such that the content of the online meeting is not presently fully visible on the screen of the client device 202. The meeting indication service 610 may determine that the online meeting is being presented in an inactive window, for example, when the user interface 104 is in a background window at the client device 202. An operating system (e.g., Microsoft Windows, macOS, Chrome OS, etc.) of the client device 202 may be configured to determine which applications/windows are in the foreground, i.e., the user 102 is working on, which applications/windows are in the background, i.e., ones that are behind the scenes, which applications/windows are minimized, and which applications/windows are maximized. The meeting indication service 610 may, for example, request the data, indicative of the user interface 104 being in an active or inactive window, using an API request to the operating systems of the individual client devices 202. In some implementations, the meeting indication service 610 may receive the data indicative of the user interface 104 being in an active or inactive window on a periodic basis (e.g., every "3" minutes, every "5" minutes, etc.).

At a step 1108 of the routine 1100, the meeting indication service 610 may determine, using the received data (in the step 1104), a number of the client devices 202 with the user interface 104 in an active window. The meeting indication service 610 may determine a total number of client devices 202 that sent data indicative of the user interface 104 (presenting the online meeting) being in an active window. Alternatively, the meeting indication service 610 may determine a total number of client devices 202 that sent data indicative of the user interface 104 being in an inactive window, and then determine the number of the client devices 202 with the user interface 104 in an active window based on the total number of client devices 202 participating in the online meeting. Additionally or alternatively, in some implementations, the meeting indication service 610 may determine a ratio or percentage of the client devices 202 participating in the online meeting for which the online meeting is being presented in an active window, e.g., by dividing a determined number of client devices 202 with the online meeting in an active window by a determined number of client devices 202 with the online meeting in an inactive window.

At a decision step 1110 of the routine 1100, the meeting indication service 610 may determine whether the number of client devices 202 (determined in the step 1108), in view of the plurality of client devices 202 (that launched the online meeting), satisfy one or more conditions. Such condition(s) may, for example, include a threshold number of client devices 202 with the user interface 104 in an active window and/or a threshold percentage of the client devices 202 with the user interface 104 in an active window. For example, a condition may be that 90% of the participating client devices 202 need to have the user interface 104 in an active window. Additionally or alternatively, the meeting indication service 610 may determine and take into account a number of client devices 202 that may have started the online meeting, but then left/exited the online meeting before the meeting's scheduled end-time.

If the quantity and/or ratio of client devices 202 with the user interface 104 in an active window does not satisfy the pertinent condition(s) (in the decision step 1110), then the routine 1100 may return to the step 1104, and the meeting indication service 610 may receive, from individual ones of the plurality of client devices 202, additional data indicative of the user interface 104 being in an active or inactive window. The additional data may correspond to the next time period (e.g., the next "3" minutes, the next "5" minutes, etc.).

If the quantity and/or ratio of client devices 202 with the user interface 104 in an active window satisfies the pertinent condition(s) (in the decision step 1110), then the at a step 1112, the meeting indication service 610 may send, to a first client device 202a of the plurality of client devices 202, the indication 109 that the content being presented is potentially of interest. In some implementations, the meeting indication service 610 may send the indication 109 to the first client device 202a based on the user interface 104 being in an inactive window at the first client device 202a. In some implementations, the meeting indication service 610 may send the indication 109 to the first client device 202a even when the user interface 104 is in an active window at the first client device 202a. The meeting indication service 610 may additionally or alternatively send the indication 109 to another client device 202 (that is not presenting the online meeting) of the first user 102a (e.g., a smartphone, a tablet, a smartwatch, etc.), in case the first user 102a is away from the first client device 202a (shown in FIG. 1C) that is presenting the online meeting.

Sending of the indication 109 to the first client device 202a may cause the first client device 202a to present the indication 109 via the user interface 104a. The indication 109 may, for example, be a pop-up dialog box as shown in FIG. 1D. In some implementations, the indication 109 may be overlaid on top of the online meeting content. In other implementations, the indication 109 may be presented in such a manner that the indication 109 is overlaid on top of any content that is actively being displayed at the first client device 202a, so that the indication 109 is visible to the first user 102a even when a window/application presenting the online meeting is minimized or in the background. In other implementations, output of the indication 109 may cause the window/application presenting the online meeting, which may have been previously minimized or in the background, to become maximized or brought to the foreground, so that both the indication 109 and the online meeting are visible to the first user 102a.

In some implementations, the indication 109 may include a number of client devices with the user interface 104 in an active window, or a percentage of participating client devices with the user interface 104 in an active window, as shown in FIG. 1D.

In some implementations, the indication 109 may additionally or alternatively include an audible indication, such as a chime, a beep, or other sound that may be outputted via one or more speakers of the client device 202. In some implementations, in addition to or in lieu of a pop-up dialog box, the indication 109 may include an image or other graphical user interface element. In some implementations, the indication 109 may additionally or alternatively be presented via a user interface other than the user interface 104, such as by way of a notification menu/bar provided by an operating system of the first client device 202a or by the resource access application 522.

G. Example Implementations of Methods, Systems, and Computer-Readable Media in Accordance with the Present Disclosure The following paragraphs (M1) through (M13) describe examples of methods that may be implemented in accordance with the present disclosure.

(M1) A method may be performed that involves determining, by a computing system, a keyword of interest for an online meeting being presented via a user interface, determining, by the computing system, that content of the online meeting corresponds to the keyword of interest, and causing, by the computing system and in response to the content of the online meeting corresponding to the keyword of interest, the user interface to output an indication that the content of the online meeting being presented is potentially of interest.

(M2) A method may be performed as described in paragraph (M1), and may further involve processing, by the computing system, text data representing words spoken during the online meeting to determine that the content of the online meeting corresponds to the keyword of interest.

(M3) A method may be performed as described in paragraph (M1) or paragraph (M2), and may further involve receiving, by the computing system, a user input indicative of the keyword of interest.

(M4) A method may be performed as described in any of paragraphs (M1) through (M3), and may further involve identifying, by the computing system, data representing user interactions with one or more applications, and determining, by the computing system, the keyword of interest using the data.

(M5) A method may be performed as described in paragraph (M4), wherein the user interface is provided at a client device, and the computing system is configured to provide remote access to the one or more applications at the client device.

(M6) A method may be performed as described in any of paragraphs (M1) through (M5), wherein the online meeting is presented, at a client device, via the user interface of a meeting application, the client device is in communication with the computing system, and the computing system is configured to provide remote access to the meeting application.

(M7) A method may be performed as described in any of paragraphs (M1) through (M6), and may further involve processing, by the computing system, the content of the online meeting being presented during a time period, determining, by the computing system, a number of times the keyword of interest is mentioned during the time period, and causing, by the computing system and based on the number of times the keyword of interest is mentioned during the time period, the user interface to display the indication.

(M8) A method may be performed that involves determining, by a computing system, data indicative of a number of client devices, from a plurality of client devices participating in an online meeting, for which a user interface for the online meeting is being presented in an active window, and causing, by the computing system and based at least in part on the data, a first client device, from the plurality of client devices, to output an indication that content of the online meeting being presented is potentially of interest.

(M9) A method may be performed as described in paragraph (M8), and may further involve determining, by the computing system, that the number of client devices indicated in the data satisfies a condition, and causing the first client device to display the indication in response to the condition being satisfied.

(M10) A method may be performed as described in paragraph (M8) or paragraph (M9), wherein the computing system is configured to host a meeting application providing the user interface, and the computing system is in communication with the plurality of client devices.

(M11) A method may be performed as described in any of paragraphs (M8) through (M10), wherein the user interface is provided by a remote access application configured to provide respective client devices access to remotely hosted applications, and the computing system is configured to facilitate access to the remotely hosted applications.

(M12) A method may be performed as described in any of paragraphs (M8) through (M11), and may further involve determining, by the computing system, that the user interface for the online meeting is in an inactive window at the first client device, and causing, by the computing system and based at least in part on determining that the user interface for the online meeting is in an inactive window at the first client device, the first client device to output the indication.

(M13) A method may be performed as described in any of paragraphs (M8) through (M12), and may further involve receiving, by the computing system and from the plurality of client devices, data indicative of the user interface for the online meeting being in an active window or an inactive window, and using the received data to determine the number of client devices for which the user interface for the online meeting is being presented in an active window.

The following paragraphs (S1) through (S13) describe examples of systems and devices that may be implemented in accordance with the present disclosure.

(S1) A system may comprise at least one processor and at least one computer-readable medium encoded with instructions which, when executed by the at least one processor, cause the system to determine a keyword of interest for an online meeting being presented via a user interface, determine that content of the online meeting corresponds to the keyword of interest, and cause, in response to the content of the online meeting corresponding to the keyword of interest, the user interface to output an indication that the content of the online meeting being presented is potentially of interest.

(S2) A system may be configured as described in paragraph (S1), wherein the at least one computer-readable medium may be further encoded with additional instructions which, when executed by the at least one processor, further cause the system to process text data representing words spoken during the online meeting to determine that the content of the online meeting corresponds to the keyword of interest.

(S3) A system may be configured as described in paragraph (S1) or paragraph (S2), wherein the at least one computer-readable medium may be further encoded with additional instructions which, when executed by the at least one processor, further cause the system to receive a user input indicative of the keyword of interest.

(S4) A system may be configured as described in any of paragraphs (S1) through (S3), wherein the at least one computer-readable medium may be further encoded with additional instructions which, when executed by the at least one processor, further cause the system to identify data representing user interactions with one or more applications, and determining, by the computing system, the keyword of interest using the data.

(S5) A system may be configured as described in any of paragraphs (S1) through (S4), wherein the user interface is provided at a client device, and the computing system is configured to provide remote access to the one or more applications at the client device.

(S6) A system may be configured as described in any of paragraphs (S1) through (S5), wherein the online meeting is presented, at a client device, via the user interface of a meeting application, the client device is in communication with the computing system, and the computing system is configured to provide remote access to the meeting application.

(S7) A system may be configured as described in any of paragraphs (S1) through (S6), wherein the at least one computer-readable medium may be further encoded with additional instructions which, when executed by the at least one processor, further cause the system to process the content of the online meeting being presented during a time period, determine a number of times the keyword of interest is mentioned during the time period, and cause, based on the number of times the keyword of interest is mentioned during the time period, the user interface to display the indication.

(S8) A system may comprise at least one processor and at least one computer-readable medium encoded with instructions which, when executed by the at least one processor, cause the system to determine data indicative of a number of client devices, from a plurality of client devices participating in an online meeting, for which a user interface for the online meeting is being presented in an active window, and cause, based at least in part on the data, a first client device, from the plurality of client devices, to output an indication that content of the online meeting being presented is potentially of interest.

(S9) A system may be configured as described in paragraph (S8), wherein the at least one computer-readable medium may be further encoded with additional instructions which, when executed by the at least one processor, further cause the system to determine that the number of client devices indicated in the data satisfies a condition, and causing the first client device to display the indication in response to the condition being satisfied.

(S10) A system may be configured as described in paragraph (S8) or paragraph (S9), wherein the system is configured to host a meeting application providing the user interface, and the system is in communication with the plurality of client devices.

(S11) A system may be configured as described in any of paragraphs (S8) through (S10), wherein the user interface is provided by a remote access application configured to provide respective client devices access to remotely hosted applications, and the system is configured to facilitate access to the remotely hosted applications.

(S12) A system may be configured as described in any of paragraphs (S8) through (S11), wherein the at least one computer-readable medium may be further encoded with additional instructions which, when executed by the at least one processor, further cause the system to determine that the user interface for the online meeting is in an inactive window at the first client device, and cause, based at least in part on determining that the user interface for the online meeting is in an inactive window at the first client device, the first client device to output the indication.

(S13) A system may be configured as described in any of paragraphs (S8) through (S12), wherein the at least one computer-readable medium may be further encoded with additional instructions which, when executed by the at least one processor, further cause the system to receive, from the plurality of client devices, data indicative of the user interface for the online meeting being in an active window or an inactive window, and use the received data to determine the number of client devices for which the user interface for the online meeting is being presented in an active window.

The following paragraphs (CRM1) through (CRM13) describe examples of computer-readable media that may be implemented in accordance with the present disclosure.

(CRM1) At least one non-transitory computer-readable medium may be encoded with instructions which, when executed by at least one processor of a computing system, may cause the computing system to determine a keyword of interest for an online meeting being presented via a user interface, determine that content of the online meeting corresponds to the keyword of interest, and cause, in response to the content of the online meeting corresponding to the keyword of interest, the user interface to output an indication that the content of the online meeting being presented is potentially of interest.

(CRM2) At least one non-transitory computer-readable medium may be configured as described in paragraph (CRM1), and may be further encoded with additional instructions which, when executed by the at least one processor, further cause the computing system to process text data representing words spoken during the online meeting to determine that the content of the online meeting corresponds to the keyword of interest.

(CRM3) At least one non-transitory computer-readable medium may be configured as described in paragraph (CRM1) or paragraph (CRM2), and may be further encoded with additional instructions which, when executed by the at least one processor, further cause the computing system to receive a user input indicative of the keyword of interest.

(CRM4) At least one non-transitory computer-readable medium may be configured as described in any of paragraphs (CRM1) through (CRM3), and may be further encoded with additional instructions which, when executed by the at least one processor, further cause the computing system to identify data representing user interactions with one or more applications, and determining, by the computing system, the keyword of interest using the data.

(CRM5) At least one non-transitory computer-readable medium may be configured as described in any of paragraphs (CRM1) through (CRM4), wherein the user interface is provided at a client device, and the computing system is configured to provide remote access to the one or more applications at the client device.

(CRM6) At least one non-transitory computer-readable medium may be configured as described in any of paragraphs (CRM1) through (CRM5), wherein the online meeting is presented, at a client device, via the user interface of a meeting application, the client device is in communication with the computing system, and the computing system is configured to provide remote access to the meeting application.

(CRM7) At least one non-transitory computer-readable medium may be configured as described in any of paragraphs (CRM1) through (CRM6), and may be further encoded with additional instructions which, when executed by the at least one processor, further cause the computing system to process the content of the online meeting being presented during a time period, determine a number of times the keyword of interest is mentioned during the time period, and cause, based on the number of times the keyword of interest is mentioned during the time period, the user interface to display the indication.

(CRM8) At least one non-transitory computer-readable medium may be encoded with instructions which, when executed by at least one processor of a computing system, may cause the computing system to determine data indicative of a number of client devices, from a plurality of client devices participating in an online meeting, for which a user interface for the online meeting is being presented in an active window, and cause, based at least in part on the data, a first client device, from the plurality of client devices, to output an indication that content of the online meeting being presented is potentially of interest.

(CRM9) At least one non-transitory computer-readable medium may be configured as described in paragraph (CRM8), and may be further encoded with additional instructions which, when executed by the at least one processor, further cause the computing system to determine that the number of client devices indicated in the data satisfies a condition, and causing the first client device to display the indication in response to the condition being satisfied.

(CRM10) At least one non-transitory computer-readable medium may be configured as described in paragraph (CRM8) or paragraph (CRM9), wherein the computing system is configured to host a meeting application providing the user interface, and the computing system is in communication with the plurality of client devices.

(CRM11) At least one non-transitory computer-readable medium may be configured as described in any of paragraphs (CRM8) through (CRM10), wherein the user interface is provided by a remote access application configured to provide respective client devices access to remotely hosted applications, and the computing system is configured to facilitate access to the remotely hosted applications.

(CRM12) At least one non-transitory computer-readable medium may be configured as described in any of paragraphs (CRM8) through (CRM11), wherein the instructions which, when executed by the at least one processor, cause the computing system to determine that the user interface for the online meeting is in an inactive window at the first client device, and cause, based at least in part on determining that the user interface for the online meeting is in an inactive window at the first client device, the first client device to output the indication.

(CRM13) At least one non-transitory computer-readable medium may be configured as described in any of paragraphs (CRM8) through (CRM12), wherein the instructions which, when executed by the at least one processor, cause the computing system to receive, from the plurality of client devices, data indicative of the user interface for the online meeting being in an active window or an inactive window, and use the received data to determine the number of client devices for which the user interface for the online meeting is being presented in an active window.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   causing, by a computing system, presentation of an online meeting via a user interface at a client device operated by a user;
   determining, by the computing system, a keyword of interest for the online meeting being presented at the client device;
   processing, by the computing system, content of the online meeting being presented during a time period of the online meeting;
   determining, by the computing system, that content of the online meeting corresponds to the keyword of interest;
   determining, by the computing system, a number of times the keyword of interest is mentioned during the time period; and
   in response to the content of the online meeting corresponding to the keyword of interest and based on the number of times the keyword of interest is mentioned during the time period, causing, by the computing system, presentation of an indication that the content of the online meeting being presented is potentially of interest, the indication being a graphical element in the user interface that includes the keyword of interest and a numeral directly representative of the number of times the keyword of interest is mentioned during the time period of the online meeting.

2. The method of claim 1, further comprising:
processing, by the computing system, text data representing words spoken during the online meeting to determine that the content of the online meeting corresponds to the keyword of interest.

3. The method of claim 1, further comprising:
receiving, by the computing system, a user input indicative of the keyword of interest.

4. The method of claim 1, further comprising:
identifying, by the computing system, data representing user interactions with one or more applications; and
determining, by the computing system, the keyword of interest using the data.

5. The method of claim 4, wherein the computing system is configured to provide remote access to the one or more applications at the client device.

6. The method of claim 1, wherein the online meeting is presented, at the client device, via the user interface of a meeting application, the client device is in communication with the computing system, and the computing system is configured to provide remote access to the meeting application.

7. The method of claim 1, wherein the indication is a popup window communicating information to the user.

8. A system, comprising:
at least one processor; and
at least one computer-readable medium encoded with instructions which, when executed by the at least one processor, cause the system to:
cause, by a computing system, presentation of an online meeting via a user interface at a client device operated by a user,
determine a keyword of interest for the online meeting being presented at the client device,
process the content of the online meeting being presented during a time period,
determine that content of the online meeting corresponds to the keyword of interest,
determine a number of times the keyword of interest is mentioned during the time period, and
in response to the content of the online meeting corresponding to the keyword of interest and based on the number of times the keyword of interest is mentioned during the time period, cause presentation of an indication that the content of the online meeting being presented is potentially of interest, the indication being a graphical element in the user interface that includes the keyword of interest and a numeral directly representative of the number of times the keyword of interest is mentioned during the time period of the online meeting.

9. The system of claim 8, wherein the at least one computer-readable medium is further encoded with additional instructions which, when executed by the at least one processor, further cause the system to:
process text data representing words spoken during the online meeting to determine that the content of the online meeting corresponds to the keyword of interest.

10. The system of claim 8, wherein the at least one computer-readable medium is further encoded with additional instructions which, when executed by the at least one processor, further cause the system to:
receive a user input indicative of the keyword of interest.

11. The system of claim 8, wherein the at least one computer-readable medium is further encoded with additional instructions which, when executed by the at least one processor, further cause the system to:
identify data representing user interactions with one or more applications, and
determine the keyword of interest using the data.

12. The system of claim 11, wherein the system is configured to provide remote access to the one or more applications at the client device.

13. The system of claim 8, wherein the online meeting is presented, at the client device, via the user interface of a meeting application, the client device is in communication with the system, and the system is configured to provide remote access to the meeting application.

14. The system of claim 8, wherein the indication is a popup window communicating information to the user.

* * * * *